Figure 15:
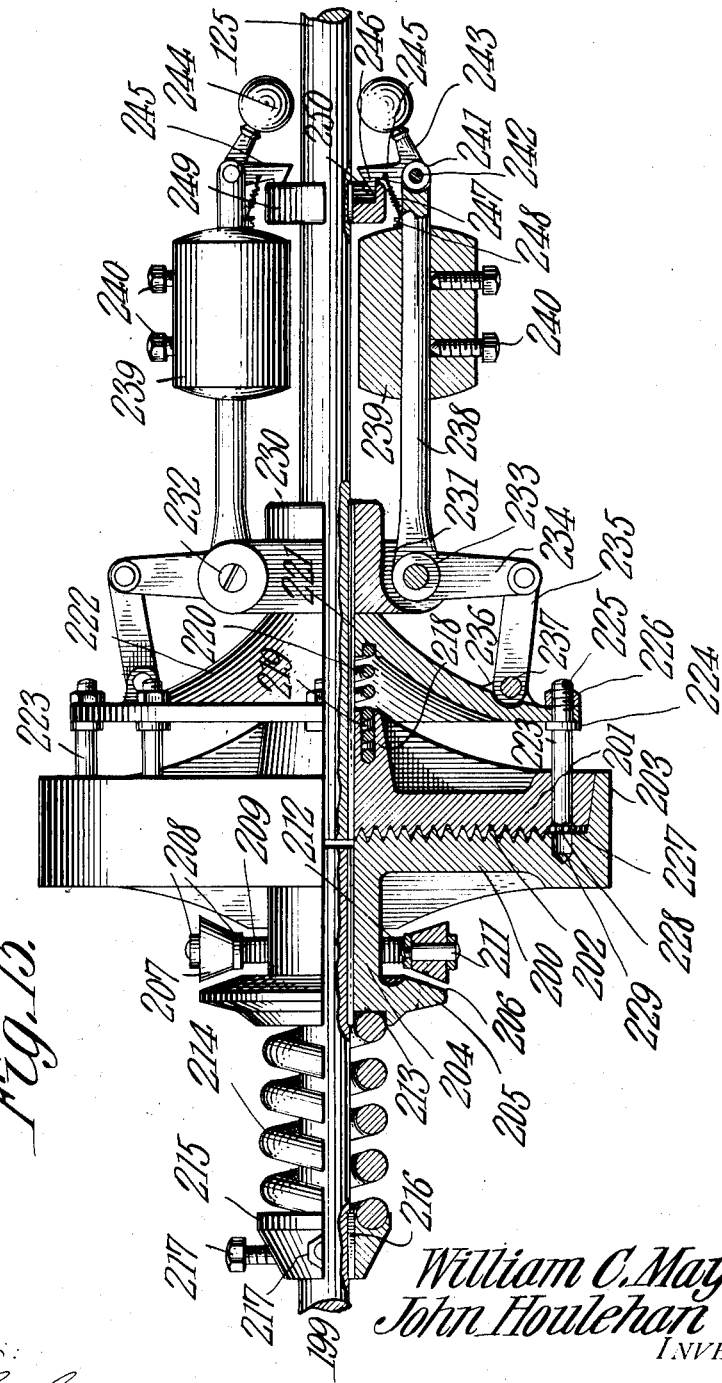

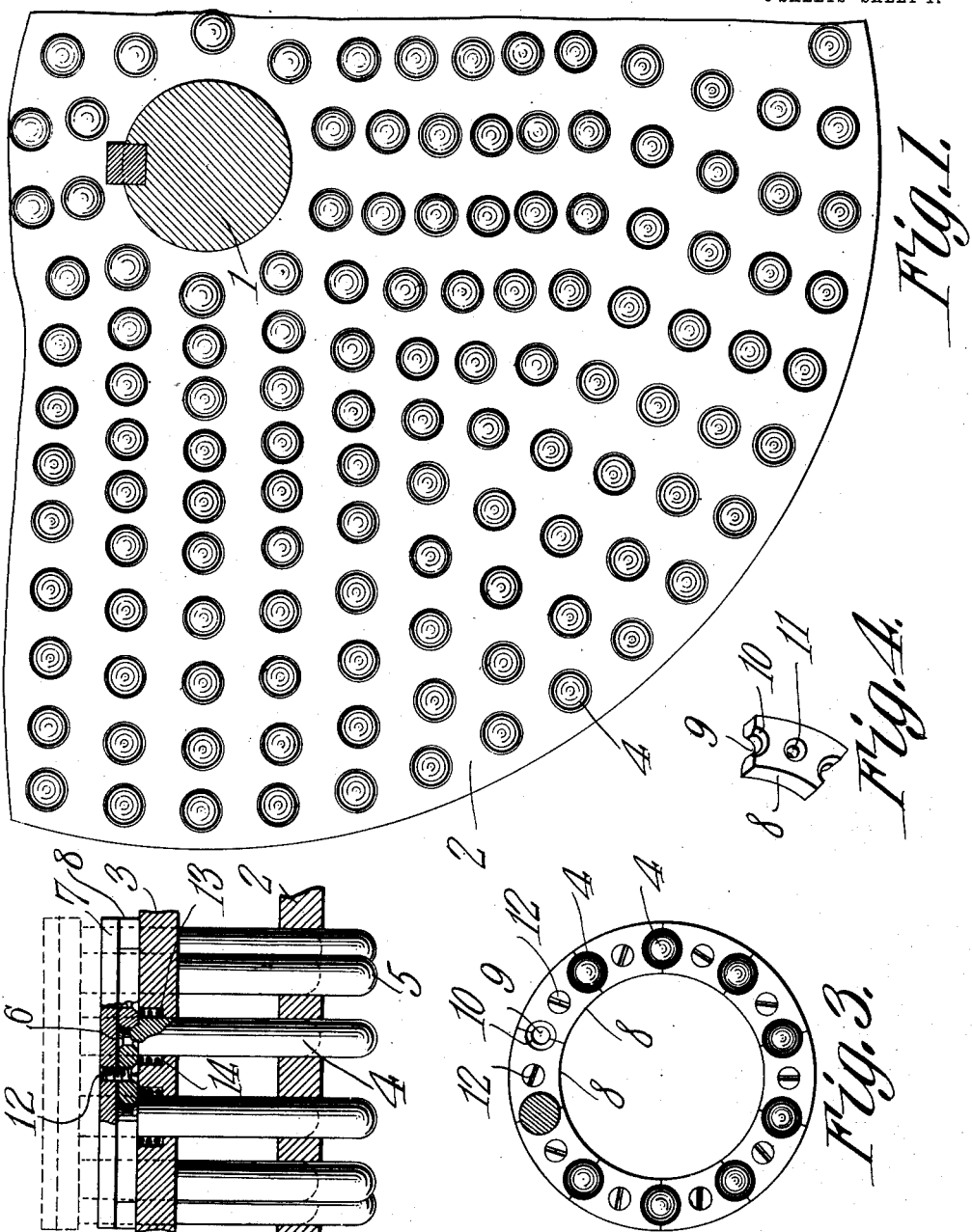

W. C. MAYO & J. HOULEHAN.
SPEED CHANGING GEAR.
APPLICATION FILED JULY 26, 1907.
901,980.
Patented Oct. 27, 1908.
6 SHEETS—SHEET 2.
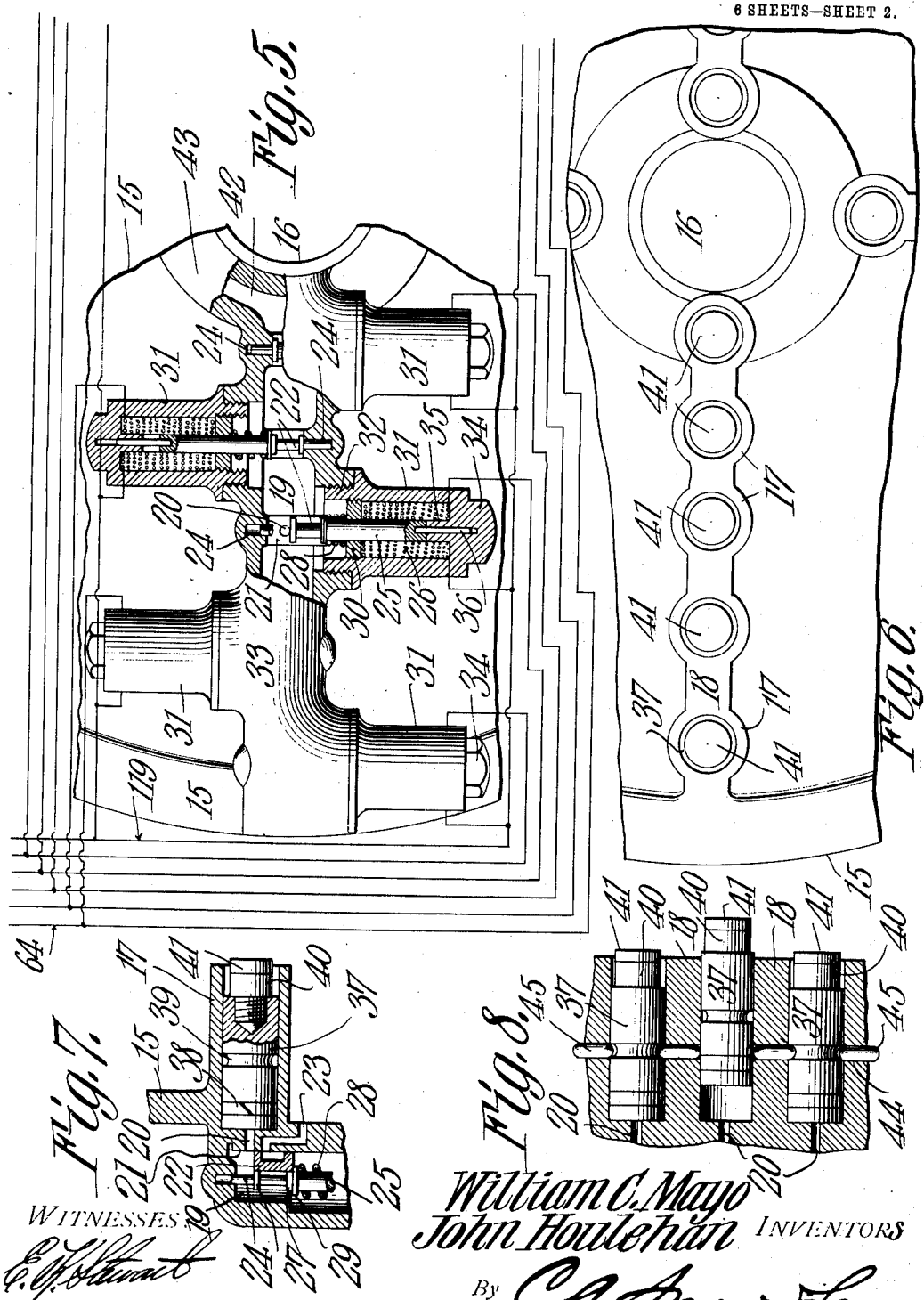
WITNESSES
E. W. Stewart
F. T. Chapman
William C. Mayo
John Houlehan INVENTORS
By C. A. Snow & Co.
ATTORNEYS

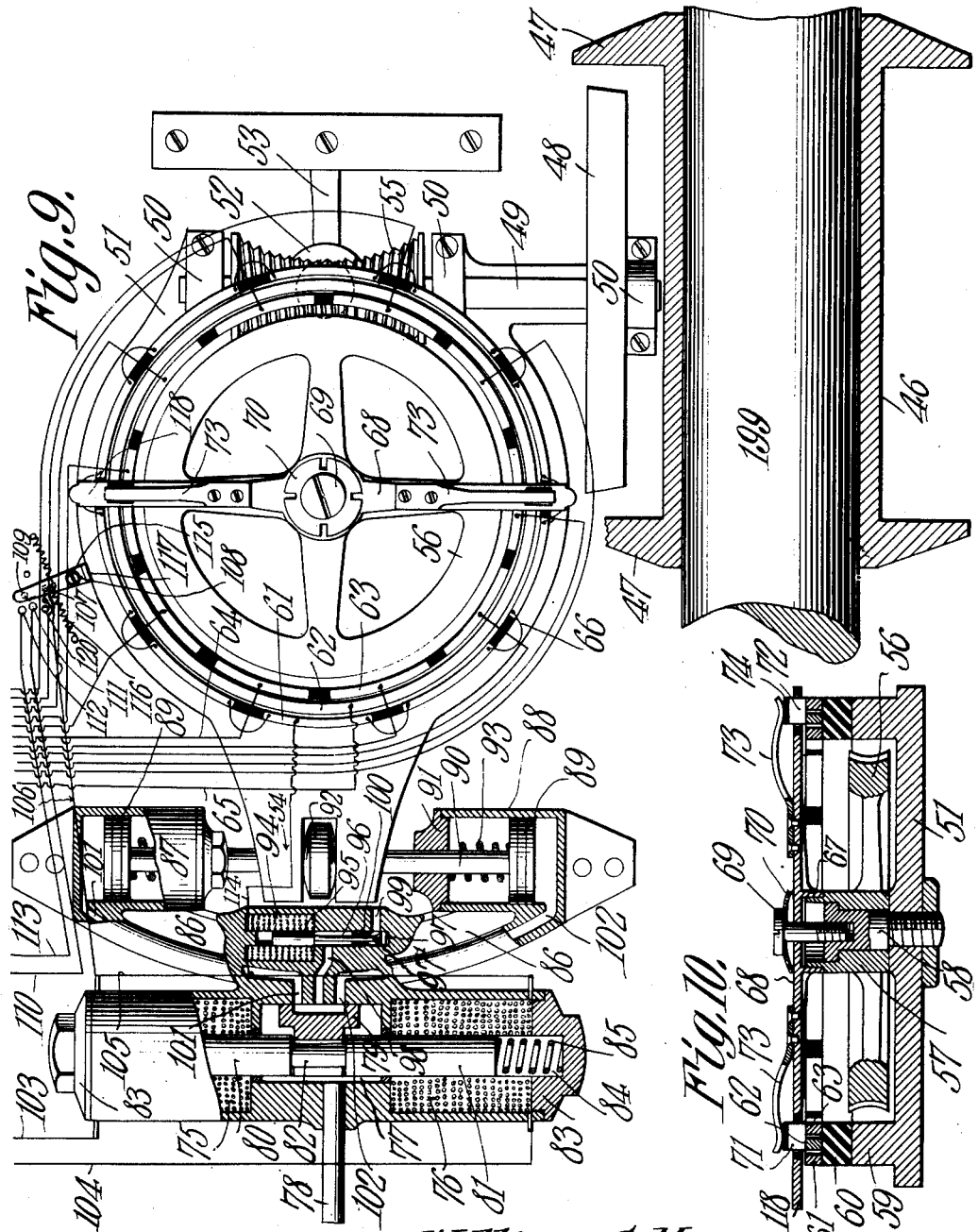

W. C. MAYO & J. HOULEHAN.
SPEED CHANGING GEAR.
APPLICATION FILED JULY 26, 1907.
901,980.
Patented Oct. 27, 1908.
6 SHEETS—SHEET 4.
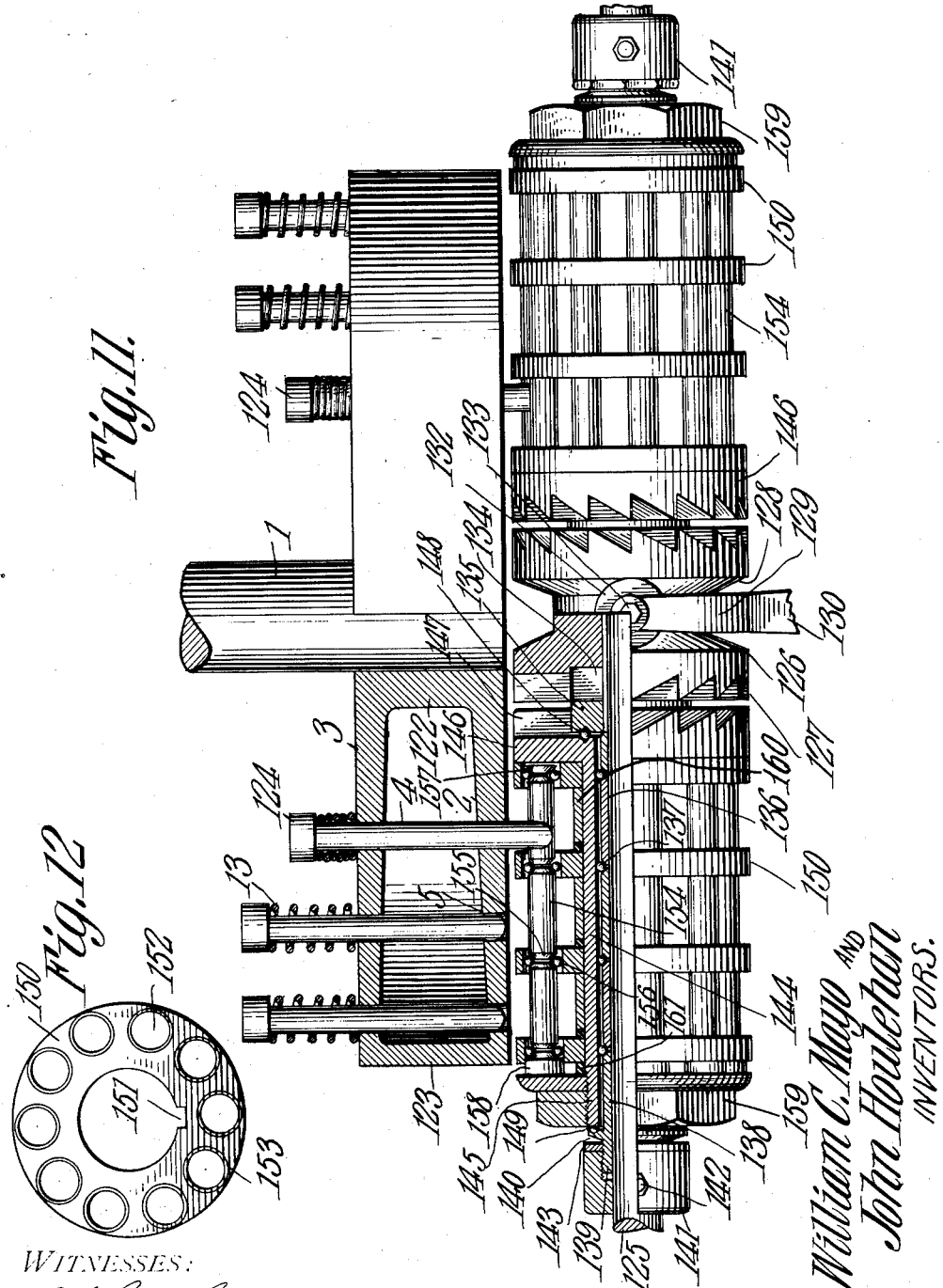
WITNESSES:
INVENTORS.
William C. Mayo and
John Houlehan
By C. A. Snow & Co.
ATTORNEYS

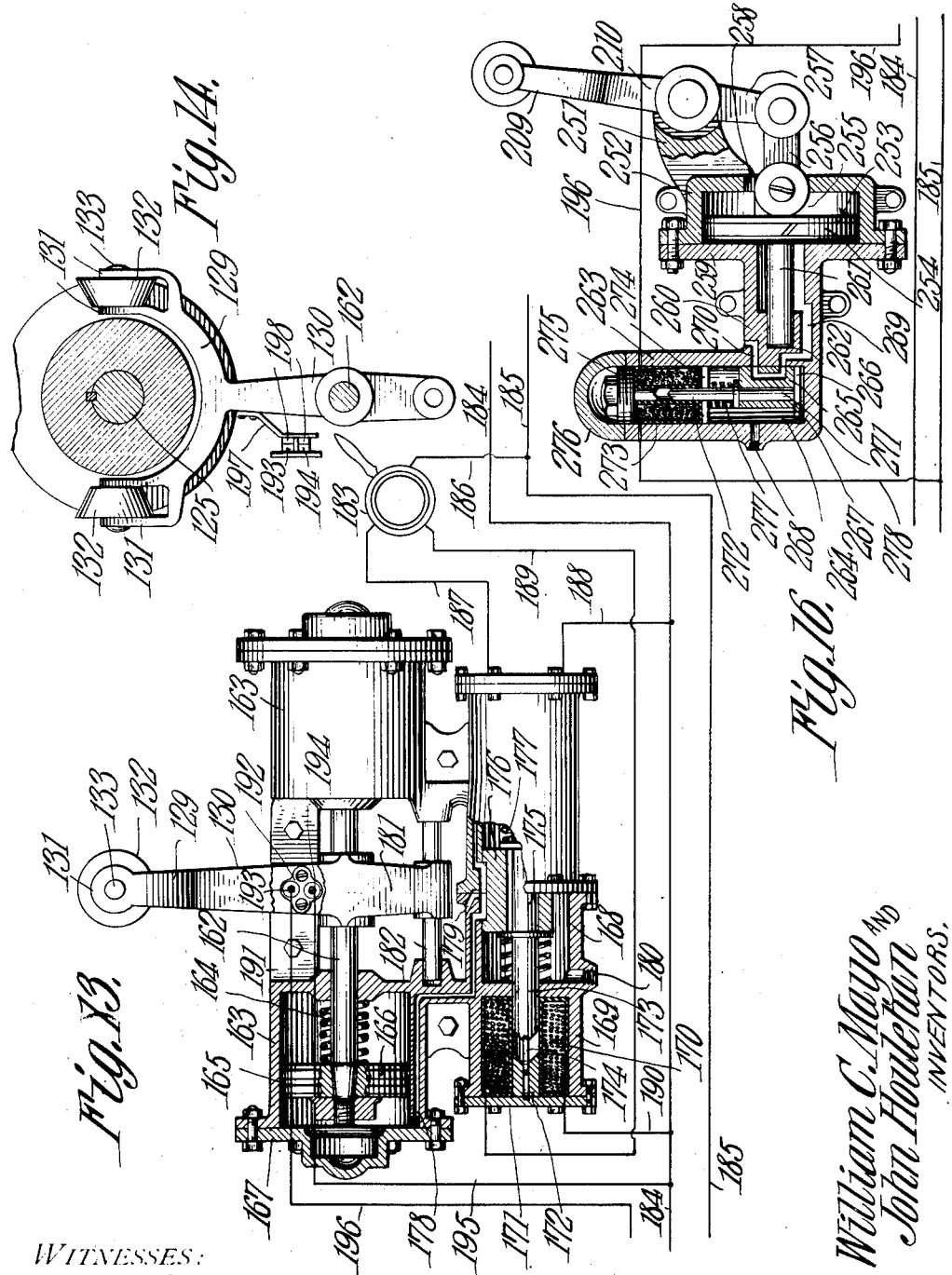

W. C. MAYO & J. HOULEHAN.
SPEED CHANGING GEAR.
APPLICATION FILED JULY 26, 1907.

901,980.

Patented Oct. 27, 1908.
6 SHEETS—SHEET 6.

WITNESSES:

William C. Mayo,
John Houlehan,
INVENTORS

By C. A. Snow & Co.
ATTORNEYS

UNITED STATES PATENT OFFICE.

WILLIAM C. MAYO AND JOHN HOULEHAN, OF EL PASO, TEXAS, ASSIGNORS OF ONE-THIRD TO GEORGE E. BRIGGS, OF BARSTOW, TEXAS.

SPEED-CHANGING GEAR.

No. 901,980.    Specification of Letters Patent.    Patented Oct. 27, 1908.

Application filed July 26, 1907. Serial No. 385,645.

*To all whom it may concern:*

Be it known that we, WILLIAM C. MAYO and JOHN HOULEHAN, citizens of the United States, residing at El Paso, in the county of El Paso, State of Texas, have invented a new and useful Speed-Changing Gear, of which the following is a specification.

This invention has reference to improvements in speed changing gear designed particularly for use in connection with our general system of motor traction to be used for urban, suburban and interstate traffic.

The object of the present invention is to provide means for changing the speed of a car automatically, in accordance with the actual requirements, and beyond the control of the motorman. With this system the motorman can, of course, start and stop the car and can speed up or slow down, but the several steps through which the speed gear may pass in speeding up or slowing down are automatically controlled.

Under the present invention the motorman has simply to set his controller to the speed-up or slow-down position, when the speed changing gear will automatically pass through the several steps for which it is constructed and the car will gradually accelerate its speed or will gradually slow down, as the case may be, and when the desired speed is reached the motorman has but to move his controller to the running position, and the car will continue to run at the speed desired.

The present invention adapts itself very perfectly to the master-control system, so that any number of cars in a train may be speeded up or slowed down from the one controller, all automatically; but since the master-control system which we have devised is not, in itself, a part of the present invention, although constituting an integral part of our motor traction system wherein each car is a complete unit but also coacts with every other car in a train to make the train an integral whole under one master-control, it is not necessary herein to consider this master-control system any further.

Since it is the general purpose of our complete system to render every necessary operation of the train as nearly automatic as may be, thus permitting the motorman to give his entire attention to the handling of the train, and to insure its safety by the elimination of the personal factor to the greatest possible extent, the structures entering into the present invention, which relates particularly to means for changing the speed of a car, are all made automatic, both when considered as applied to one car only and when considered as applied to each car making up a train.

In the consideration of the present invention it is to be assumed that the car is supplied with an air-brake system from which compressed air, say, at the usual seventy pounds' pressure per square inch, may be drawn for the operation of certain parts of the apparatus forming the subject-matter of the present invention; and it is to be further assumed that there is upon the car a suitable source of electric current capable of supplying such electrical energy as is necessary for the operation of the electro-mechanical devices which are used in connection with the present invention.

Now, considering more specifically the present invention, we may state that we provide for any desirable number of speeds between the prime mover and the axles of a car. In our general system the prime mover is a continuously running, explosive or internal combustion engine arranged to maintain an approximately constant speed under varying loads by governing means which we have devised and which forms a part of our general system but does not belong directly to the present invention, and, therefore, need not be here considered. We may take ten speeds as an example. For this purpose we provide what we may term a transmission disk having ten annular series of equidistantly spaced pins arranged to engage the roller teeth of suitably disposed gear wheels or pinions. These pins are so arranged as to be moved into engagement with roller teeth on the gear wheels or pinions so that the disk, which is mounted, for rotation, upon a suitable shaft, is coupled to the gear wheels or pinions by means of the projected pins. Now, since the annular series of pins, being equally spaced, must of necessity increase in number as they recede from the axis of the disk, therefore, the disk being the driven member, a pinion engaged by one of the series of pins will drive the disk at a speed commensurate with the number of pins in the particular annular series. Suppose, for instance, that the innermost series contains ten teeth and the outermost series contains fifty teeth; then the disk will be driven at a certain speed when actuated by the series containing ten teeth, and one-fifth that speed when actuated by the outermost series containing fifty teeth, while the intermediate series will drive the disk at gradually accelerated speeds from the outermost series toward the innermost series, or at gradually decreasing speeds from the innermost series toward the outermost series.

In order to prevent damage to the structure, it is necessary that but one series of pins be projected into engagement with the drive member at any one time, and that one series of pins shall be withdrawn before the next series of pins is projected. For this purpose means are provided for locking the series of pins next adjacent to each side of the projected series in such manner that no series of pins can be projected into engagement with the drive member until the already projected series has been withdrawn.

In accordance with the present invention the series of pins are projected in regular order, one after another, whether receding from or approaching the axis of the driven shaft, and for this purpose certain electro-mechanical means are provided. The electrical means are utilized for the purpose of controlling certain air valves, while the mechanical means are operated by air pressure under the control of the electrically operated valves, and means are also provided whereby these several electrically operated valves can only be actuated in a certain predetermined sequence.

Since the invention can be best understood by the consideration of a practical embodiment thereof, we will now proceed to describe the several structures and electric circuit connections whereby the various purposes of the invention may be successfully accomplished. We therefore refer to the accompanying drawings forming part of this specification, in which,—

Figure 1 is a face view of the transmission disk carrying the pins designed to engage the drive gear, said view showing a little more than a quadrant of said disk; Fig. 2 is a cross section through a portion of the transmission disk, showing some of the pins in elevation; Fig. 3 is a face view from the pin side of one of the pin-carrying rings, with one pin removed and another pin shown in section; Fig. 4 is a perspective view of one of the spacing and retaining blocks utilized in the structure shown in Figs. 2 and 3; Fig. 5 is a rear view, partly in section, of a portion of the mechanism for projecting the pins shown in Figs. 1, 2 and 3; Fig. 6 is a face view of a portion of the structure of which part is shown in Fig. 5; Figs. 7 and 8 are detail views of certain portions of the pin-actuating means; Fig. 9 is a view, partly in section and partly diagrammatic, showing the means for automatically controlling the seriatim projection of the series of pins on the transmission disk; Fig. 10 is a central section through the mechanism shown in Fig. 9. Fig. 11 is an elevation, partly in section, of the transmission disk and driving pinions therefor, with the transmission disk illustrated in a partially diagrammatic manner; Fig. 12 is a detail view of a modified form of a portion of one of the driving pinions; Fig. 13 is a longitudinal section, partly in elevation, of a clutch-operating mechanism coacting with the driving pinions shown in Fig. 12; Fig. 14 is a detail view of the clutch arm and parts coacting therewith; Fig. 15 is a side elevation, partly in section, of a clutch mechanism interposed between the prime mover and the pinions driving the transmission disk; and Fig. 16 is a sectional view of the electro-mechanical means for operating the friction clutch device.

Referring more particularly to Figs. 1, 2, 3 and 4, there is shown a shaft 1 which is preferably connected to the drive of the car by a special gear which we have devised and which forms a part of our general system but which, constituting no part of the present invention, is not shown in the drawings and need not be here described. Keyed upon the shaft are two spaced disks 2—3 which may be formed in one piece with a suitable hub and joined at their outer edges by a peripheral web, the whole constituting one casting, as indicated in Fig. 11. The disk 2 is shown in Fig. 1, while a portion of each disk 2 and 3 is shown in Fig. 2. Each disk 2 and 3 is provided with a suitable number of matched perforations for the passage of pins 4 arranged in concentric annular series from a point adjacent to the shaft 1 to near the periphery of the disks. In the following description the disks 2 and 3 taken collectively will be referred to as the transmission disk simply, for convenience of reference, since the two disks operate as and are in fact one structure and are spaced apart so that the pins 4 may have ample support. Each pin is cylindrical in shape with one end rounded, as shown at 5, and the other end formed into a stud 6 with an intermediate reduced portion. The several pins are secured by their stud ends 6 to an annulus or ring 7 by means of segmental spacing blocks 8, each of which latter has at its ends semi-circular recesses 9 suitably countersunk, as shown at 10, while at an intermediate point there is another countersunk perforation 11. When the blocks 8 are assembled upon the ring 7 the countersunk recesses 9 match and receive the studs 6 of the pins, while screws 12, passing through the perforations 10, serve to secure the blocks 8 to the rings 7. The pins 4 are thus grouped in annular series and equi-distantly spaced by means of the blocks 8 and rings 7.

When in position the pins 4 rest in the perforations in the parts 2 and 3 of the transmission disk with their ends 5 flush with the outer face of the part 2, being constrained to assume this position by means of springs 13 seated in countersunk portions 14 of some of the perforations in the part 3 and surrounding the corresponding pins 4 passing through such perforations, or the springs may simply bear against the part 3 without the latter being countersunk to receive the springs. This latter construction is shown in Fig. 11. There will be only so many springs 13 to each series of pins as may be necessary to cause the latter to normally assume the position with their ends 5 flush with the outer face of the disk 2. In Fig. 2 are shown springs 13 as surrounding two adjacent pins 4, but this is not to be taken as the arrangement which will necessarily be followed, since these springs may be disposed in any desired manner.

In Fig. 1 are shown ten annular series of pins 4, but it will be understood that there may be more or less of these series, as desired. In Fig. 11 three series only are shown, for convenience of illustration.

In operative relation to the transmission disk there is, in practice, a gear system by means of which power may be transmitted to the disk. Such gear is shown in Fig. 11 and will be hereinafter described in detail. For convenience of description the transmission disk will be hereinafter considered as the driven member, with the understanding, however, that it is also adapted to be used as the drive member, if desirable. There will, of course, be a pinion on each side of the axis of the transmission disk, with suitable means for clutching the same to the drive shaft so that, if it be desired to reverse the direction of the driven shaft, this may be done by causing the pins of any series to engage both pinions and clutch one or the other of said pinions to the driven shaft. We have devised certain means, coöperating as part of the structure of the present invention, for the purpose of changing the direction of rotation of the drive member or driven member, as the case may be, and this, too, will be described further on with reference to Figs. 11 to 15.

Referring, now, to Figs. 5, 6, 7 and 8, we will proceed to set forth the means whereby any one of the annular series of pins may be projected from the transmission disk into the path of the pinions hereinafter described. There is shown a disk 15 which is held against rotation by suitable connections to fixed parts of the car (not shown) and is provided with a central opening 16 allowing ample clearance for the passage of the shaft 1, which, in this view, is not shown. This disk 15 is immediately back of the transmission disk but sufficiently spaced therefrom for the accommodation of the parts to be described and for their operation. Projecting from one side of the disk 15 are radial series of cylinders 17 connected by webs 18. In the particular structure shown there are four radially disposed series of cylinders 17, in two diameters ninety degrees apart, the cylinders of each diametric series being arranged in matched pairs on opposite sides of the axis of the disk, that is, a cylinder 17 on one side of the axis of the disk finds its counterpart spaced equi-distantly from the axis of the disk in the diametrically opposite series. This arrangement of the cylinders 17 is to provide two cylinders for each annular series of pins 4, as will hereinafter appear. We are not at all limited to the exact arrangement of the cylinders 17, since they may be otherwise disposed, and they may be all located on one diameter if desirable. On the opposite side of the disk there is formed a radial channel 19 for each radial series of cylinders 17, and this channel connects by means of ports 20 with the base of each cylinder 17. Arranged to cross the channel 19 are valve seats 21 for slide-valves 22 so constructed as to open or close the ports 20 to the channel 19 or to an exhaust passage 23, as the case may be, the latter port or channel communicating with the external air. Each slide-valve 22 may be held to its seat by the usual elliptical spring commonly used in connection with slide-valves, though such structure is not shown in the drawings, and each valve 22 is under the control of a rod 24 formed on one end of an armature 25 of a solenoid 26. The rod 24 is provided with collars 27 at each end of the slide-valves 22 to cause the latter to move with the rod. Surrounding the armature 25 there is a helical spring 28 confined between another collar 29 on the armature and a threaded head 30 at the corresponding end of the solenoid 26. Inclosing the solenoid is a cylindrical casing 31 provided with a threaded sleeve 32 at one end entering a suitable nut formed in a side perforation in the walls 33 of the channel 19, and this cylinder 31 may be closed at the outer end by a head 34 suitably shaped to receive a wrench or other tool by means of which it may be screwed into place. The head 34 is formed with a central stud 35 entering the bore of the solenoid and constituting a pole piece for the latter, while a guide rod 36 on the armature, entering a perforation in the head 34, serves to center the said armature. It will be seen by this structure that the solenoid is of the ironclad type, which type we prefer to use. It will also be seen that the structure is such that when a solenoid 26 is energized its armature 25 is moved in a direction to compress the spring 28 and open the corresponding port 20 to place the channel 19 in communication with the interior of the corresponding cylinder 17. When the solenoid is deënergized the spring 28 will return the armature 25 to its normal position which will put the port 20 into communication with the exhaust passage 23 through the slide-valve 22.

Within each cylinder 17 there is a piston 37 of the familiar trunk type, having near its rear end a packing ring 38 and at an intermediate point an annular groove 39. The outer end of the piston 37 is tapped to receive the threaded shank of a head 40 carrying on its outer end a bearing face 41. This bearing face 41 is preferably made of vulcanized or indurated fiber but may be made of any other suitable material and may be secured to the head 40 in any suitable manner.

In the normal position of the parts the pistons 37 in the several cylinders 17 are contained therein with their rear ends at the bottoms of said cylinders, while the fiber bearing faces are in contact with the respective rings 7 of the several series of pins 4, which latter are presumed to be under these circumstances in their retracted position, that is, with their ends 5 about flush with the face of the transmission disk. Now, when a pair of solenoids are energized the corresponding ports 20 are uncovered by the valves 22, and since the channels 19 are in communication through suitable conduits (not shown) with the compressed air supply of the car, such compressed air will flow through the ports 20 behind the pistons 37 and force the corresponding pair of pistons outwardly toward the transmission disk, thus causing the corresponding rings 7 to move against the action of the springs 13 and project the corresponding pins 4 beyond the face of the transmission disk. This will cause the particular series of pins projected to engage the drive gear and thus actuate the disk at a speed corresponding to the particular series of pins projected. For instance, if that series of pins farthest from the shaft 1 is projected, the transmission disk will be rotated at the slowest speed, and if the innermost series of pins be projected, then the transmission disk will be rotated at the highest speed, assuming, of course, that the driving gear is rotated at constant speed.

We have hereinbefore mentioned that there are provided two actuating means for each set of pins, and these means are arranged on diametrically opposite points of the axis of the particular annular series of pins. These actuating means are arranged to operate simultaneously so that there will be no tendency to cause the pins to cramp when projected from the disk, as will be readily understood. Of course, there will be some friction between the heads 41 and the rings 7 but the amount of force necessary to hold the pins against the action of the springs 13 need be but small, and, consequently, the frictional contact between the heads 41 and the rings 7 may be correspondingly light. This, however, will be largely negligible, since ample lubrication may be provided by inclosing the entire structure in a suitable casing and filling the latter with oil, so that the parts are always immersed in oil.

In order that all the channels 19 may be in communication, they may be connected through a common duct 42 formed in an annular boss 43 constituting the hub of the disk 15.

As will hereinafter more fully appear, it is the design of this structure to cause the series of pins to be moved successively into and out of engagement with the drive gear, so that the speed of the transmission disk may be progressively increased or decreased, while the driving gear maintains a practically constant speed. Thus, for instance, if the position of the parts is such that the outermost series of pins is in engagement with the drive gear and the speed is to be raised, the first or outermost series of pins will be retracted and series number two will be projected, and when the speed has reached the proper acceleration series number two will be retracted and series number three will be projected, and so on until the desired acceleration has been accomplished, if need be up to the full speed for which the device is designed. For the reduction of speed the reverse operation takes place, but always progressively, step by step. Now, it is possible that by a sluggish action of one annular series of pins, or from some other cause, the next series might be projected into engagement with the drive gear before the preceding series had been withdrawn, and the result would be disastrous to the structure. To provide for such a contingency, there is formed in the web 18 between adjacent cylinders 17 a channel 44 in which is located a pin 45. The channel 44 is coincident with the annular groove 39 in the corresponding piston 37 when the latter is in its retracted position. The ends of each pin 45 are rounded, and the pins are of such length that when one end is seated in a groove 39 the other end is flush with the walls of the bore of the next cylinder 17.

Let it be assumed that a certain pair of pistons 37 have been projected. When this occurs the pins 45 are forced outward from the groove 39 in each projected piston 37, and the other ends of these pins engage in the channels 39 in the next adjacent piston 37 controlling both the preceding and succeeding annular series of pins 4 to the particular annular series under the control of the projected pistons. This condition is illustrated in Fig. 8, and it will be seen that when any particular pair of pistons 37 is active to project a series of pins 4 into engagement with the drive gear, the series of pins 4 on either side of the active series is effectually locked, since the actuating pistons 37 can then not be forced into a position to act on the said series of pins 4.

Suppose that the projected piston shown in Fig. 8, which piston may be taken as indicative of a pair of pistons, is about to be withdrawn, having the port or channel 20 put into communication with the external air, but suppose that for some reason the springs 13, engaging the rings 7, fail to act promptly but do act somewhat sluggishly. In the meantime, air has been admitted behind the next succeeding pair of pistons 37. Under these conditions, the second pair of pistons 37 cannot move outwardly under the impulse of the air pressure, since they are locked by the pins 45, nor can they move until the first-mentioned piston 37 has become finally seated in its cylinder 17, when the pressure exerted on the next succeeding piston will cause the pins 45 to be moved radially away from the energized piston and become seated in the grooves 39 in the next adjacent pistons, thus locking these last-named pistons against movement should the second active pair of pistons be sluggish in their movement. There is thus provided an automatic means whereby any chance of two sets of pins being projected at any one time is most effectually obviated. Now, suppose that the next succeeding series of pins are projected from the transmission disk under the action of the air pressure behind the corresponding pistons 37, and because of difference in relative movement between the teeth of the drive gear and the pins either preceding or succeeding the series withdrawn, the projected series may strike the drive gear in such manner as to not immediately mesh therewith. Under these conditions no harm can result, since the cylinders 17 are small and the air behind the pistons therein acts more or less as a cushion, and besides all this, the ends of the pins 4 are rounded, and, consequently, the cushioning effect of the air and the action of the rounded ends of the pins will cause the pins to quickly mesh with the drive gear and so be free to be projected to their full extent, and they will be held in this position by the air pressure behind the pistons 37. This will be assisted by the fact that the drive gear has ball-bearing rollers instead of teeth, as will hereinafter appear.

In the practical operation of the device each succeeding series of pins 4 will actually come into mesh with the drive gear almost instantaneously. But because of the change of speed, and because of the fact that only a temporary frictional connection is used, as will hereinafter appear, the car would be subjected to a shock or jar due to the sudden change from one speed to the other, even though such change be comparatively small.

Our complete system, however, makes provision for this condition by providing a means whereby there is a certain elasticity in the connections between the prime mover and the car wheels, so that these shocks or jars will be absorbed and all deleterious effects or strains upon the running gear will thus be prevented. It is unnecessary to describe our means for absorbing such shocks or jars, since it forms no part of the present invention though an integral and necessary part of our complete system. The present invention does, however, include a clutch between the engine and drive gear, to be hereinafter described, said clutch acting both as a friction clutch and as a positive clutch.

It will be seen that we propose to operate the solenoids in pairs; and, also, that for the purpose of gradually increasing or decreasing the speed without large variations from one step to the next it is necessary to provide a considerable number of intermediate speeds between the highest and lowest. This we have shown in the drawings, wherein the transmission disk is capable of providing ten different speeds, but, of course, a larger or smaller number may be provided. Therefore, taking the ten speeds as an example, and assuming that each car is provided with the same means for attaining these various speeds, it will be seen that in order to couple all these pairs of solenoids to the controller under the hand of the motorman by usual means, it would be necessary to provide at least eleven electric conductors running through the train, and at the same time the speed variations would be under the direct control of the motorman.

Now, it is the purpose of our general system to provide for the automatic operation of the train control wherever possible. It is also our purpose to place the speed regulation entirely out of the hands of the motorman, except in so far as the motorman may be able at will to start or stop a car and may be able to change the speed, but only through the successive steps provided and then only in such order and time relation as may be necessary to protect the mechanism and to avoid shocks and jars to the car or train. It is also the purpose of our invention to provide a means whereby the running of a large cable of electric conductors through a train, with all its attendant disadvantages, is avoided. We have therefore devised an automatic means for energizing the solenoids in proper succession, and such means is shown in Figs. 9 and 10, to which reference is now made.

In Fig. 9 the engine shaft is shown at 199. This shaft, which, it is to be understood, is the regular crank shaft of the engine, may be extended on both sides of the engine and carries apparatus needed for the various operations of the car, such as the dynamo drive, air pump, the engine governor, the shock absorber, and other parts, all included in our general system and to which reference need not here be made any further than has already been made, to be now described with reference to Figs. 9 and 10 and later with reference to Figs. 15 and 16.

Fixed upon the engine shaft 199 is a sleeve 46 having annular end flanges 47. Between these flanges is located a friction drive wheel 48 on the end of a shaft 49 journaled in boxes 50 on a frame 51 pivoted at 52 on a bracket 53 secured to a fixed portion of the car or of the engine frame.

The frame 51 may be of general circular shape, with its pivot 52 near the periphery, and diametrically opposite this pivot the frame is provided with a bifurcated extension 54 to be hereinafter referred to. Mounted on the shaft 49 is a worm 55 in mesh with a worm wheel 56, which latter is provided with a hub 57 through which passes a pivot screw 58 fast in the base of the frame 51 and constituting an axis around which the worm wheel 56 may be rotated. Surrounding the worm wheel 56 and concentric therewith and rising from the frame 51 is an annular flange 59 upon which is placed a ring 60 of insulating material, and upon this insulating ring are three annular series of contacts 61, 62 and 63. The contacts 61 are shown as ten in number, with their contiguous ends spaced a certain distance to be hereinafter referred to. The contact 62 is shown as a continuous ring. The contacts 63 are shown as ten in number, with their contiguous ends opposite the middle of the corresponding contacts 61 and spaced a less distance than the spaces between the contiguous ends of said contacts 61. Each contact 63 is connected by a conductor 64 to a corresponding pair of solenoids 26, shown in Fig. 5, and the continuous contact 62 is connected to a conductor 65 leading to the prime source of current, which, in our system, is a dynamo drive of the main engine. The contacts 61 are all connected together in series by loop or jumper conductors 66 bridging the space between the contiguous ends of these contacts 61.

The hub 57 of the worm wheel 56 is extended above the pivot screw 58 and is there provided with an annular seat for the hub 67 of an arm 68 extending diametrically across the contacts 61, 62 and 63 but sufficiently above the same to be out of contact therewith. This arm is pivotally supported by means of a screw 69 entering a nut formed in the pivot screw 58 and holding the arm to its seat through the intermediary of a spring washer 70. One end of the arm 68 is provided with a slot for a contact brush 71 so located as to ride upon the contacts 62 and 63 but be out of the path of the contacts 61. The other end of the arm is provided with a slot for another contact brush 72 riding on the contacts 61 and 62 but out of the path of the contacts 63. These brushes are insulated from the arm 68, although free to move therethrough, and are held against the respective contacts 61, 62 and 63 by means of springs 73 having their free ends bearing upon the blocks through an interposed insulation 74, and their other ends fast on the arm 68. The connection between the arm 68 and the worm wheel 56 is such that when the latter is rotated the arm 68 participates in such rotation and moves in one direction or the other, as the case may be, so as to carry the brushes 71 and 72 over the contacts 61, 62 and 63. It may be observed that these brushes 71 and 72 serve no other function than to bridge the respective contacts with which they are in engagement. It will be understood, of course, that both these brushes and the several contacts will be made of copper or bronze or other suitable conducting material.

The frame 51 is designed to be moved around its pivot 52 to an extent sufficient to bring the wheel 48 into contact with one or the other of the flanges 47 on the sleeve 46. This wheel 48 has its periphery slightly beveled so that when brought into contact with one or the other of the flanges 47 it may make good contact therewith, since this drive is a friction drive. As before explained, the engine is constantly rotating, and, consequently, the shaft 199 and sleeve 46 are also constantly rotating. Now, when the wheel 48 is brought into contact with one of the flanges 47 the shaft 49 and worm 55 will be set in rotation in a corresponding direction and the worm wheel 56 will be moved about its axis, carrying with it the arm 68 and the brushes 71 and 72. When the wheel 48 is brought into contact with the other flange 47 the direction of rotation of the parts will be reversed, and when the wheel 48 is in the intermediate position the said wheel and the parts driven thereby are in a state of rest. In order to move the wheel 48 into engagement with either flange 47 there is provided an electrically controlled means which we will now proceed to describe.

Fixed on the engine frame or on some other fixed portion of the structure are two solenoids 75—76, in line one with the other and having centrally between them a common valve chest 77 receiving compressed air through a pipe 78 coming from the compressed air supply of the general system. This valve chest has an ordinary slide-valve 79 under the control of two solenoid armatures 80 and 81 having a common connection 82 between them and by which the slide-valve is actuated.

The solenoids may be of the ironclad type, and, therefore, the valve chest and the casing to the solenoids may be all cast in one piece, or in more than one piece if it be found necessary for the proper machining of the parts. The ends of the casings for the solenoids are closed by screw-plugs 83 provided with axial chambers 84 for the reception of springs 85 bearing against the ends of the solenoid armatures 80 and 81 and maintaining them normally in a state of equilibrium.

The solenoids 75 and 76 are shown conventionally only, since, in practice, they will be more or less similar to the solenoid shown in Fig. 13, and hereinafter described with reference thereto.

Fast on one side of the valve chest is a bracket 86 extending in both directions from the valve chest and carrying at its ends two cylinders 87—88 having their longitudinal axes in the same plane, and these cylinders are opposed one to the other. Each cylinder contains a pistion 89 fast on a piston-rod 90, which piston-rod may be common to both pistons and extends through a cylinder head 91 on each cylinder. Midway between the two pistons the piston-rod carries a block 92 having appropriately curved faces and located between the arms of the forked end 54 of the frame 51. Confined between each piston 89 and the cylinder head 91 is a spring 93.

In the bracket 86, adjacent to the valve chest 77, is a small solenoid 94, the armature 95 of which is provided with a stem 96 carrying at its end a valve 97. This stem extends through a portion of an exhaust passage 98 coming from the interior of the valve chest 77 and exhausting to the air through a port 99. In the exhaust passage is a valve seat 100. On each side of the exhaust passage 98 are air ducts 101 and 102 leading to the cylinders 87 and 88 respectively, back of the pistons 89 therein.

The solenoid 75 is connected up on one side by a conductor 103 to the controller to be manipulated by the motorman, but which is shown in the drawings only conventionally, and the solenoid 76 is connected up by a conductor 104 to the same controller. The other sides of the terminals of both solenoids are connected together by a conductor 105 from whence leads another conductor 106 to a terminal 107 normally in contact with a switch-arm 108 to be hereinafter referred to. Another terminal 109, also in contact with said switch-arm 108, is connected to the common return 110 leading to the main source of electric power, which, as before explained, is a dynamo driven by the engine before referred to. In practice the source of current is the power circuit through the train, to which all dynamos are connected. In the common return there is also another terminal 111 adjacent to which is a terminal 112 arranged, under certain conditions, to be bridged by the switch-arm 108, and this terminal 112 is connected to a conductor 113 which leads to a portion of the governor for the engine, which governor forms an integral part of our complete system but no necessary part of the specific invention here under consideration, and, therefore, it need not be further considered except to state that the switch-arm 108 is designed for the momentary closure of the circuit through the terminals 111 and 112, but which circuit has no part in the structure now under consideration.

The solenoid 94 has one terminal connected to the conductor 105, as indicated, and the other terminal connected by a conductor 114 to one of the series of contact segments 61, and, therefore, to all of these segments since they are all connected in series as before described.

Referring to the switch-arm 108, it may be noted that it is pivoted at a point 115 and is under the control of two opposing springs 116. Beyond the pivot point 115 the switch-arm has an upturned end 117 arranged in the path of an extension 118 of the arm 68 carrying the bridging blocks 71 and 72.

When the parts are in the position of equilibrium it may be noted that the valve chest 77 is out of communication with either of the ports 101 and 102 and with the exhaust passage 98, and that these three passages are bridged by the slide-valve 79, thus putting both cylinders 87 and 88 into communication with the exterior air. Under these conditions the springs 93 tend to hold the frame 51 in a central position, so that the friction wheel 48 is out of contact with either of the flanges 47 on the sleeve 46, and, therefore, the parts are all in a position of rest. Now, let it be supposed that the solenoid 76 is energized. Its armature 81 is drawn into the solenoid within the slide-valve 79 to a position to open the passage 101 to the interior of the valve chest 77. Compressed air will now flow into the cylinder 87 behind its piston 89 and cause the rotation of the frame 51 about its pivot 52 in a direction toward the other cylinder 88. This will bring the friction drive wheel 48 into contact with the flange 47 on the sleeve 46 toward the right as viewed in Fig. 9. As soon as the frictional contact is established the wheel 48 will rotate, and through the worm 55 rotative movement will be imparted to the worm wheel 56. This will cause the bridging contacts 71 and 72 to be carried over the series of contact plates 61, 62 and 63.

In the position of rest the bridging brush 71 establishes the circuit between one of the segmental contacts 63 and the continuous contact 62. The circuit, therefore, is from the dynamo through the conductor 65 to the continuous contact 62, thence by way of the bridging brush 71 to one of the segments 63, thence by the appropriate conductor 64 to a pair of solenoids 26 and by way of a common return conductor 119 (see Fig. 5) to the dynamo. Thus, when the parts are in the position of rest the circuit is established through some one of the pairs of solenoids 26 so that some one of the series of pins 4 is projected into engagement with the drive gear with which they mesh. However, when the wheel 48 is brought into contact with the corresponding flange 47, the brush 71 is carried over from the particular segment 63 with which it was in contact to the next segment 63, and as the rotation continues the brush is carried to the third contact 63, and so on. This causes the deënergization of the solenoids 26 first considered and the energization of the next in order, to be in turn deënergized and the third set energized, and so on. Such operation will cause a gradual change in speed through the transmission gear in a manner already described and which need not be here repeated. Assume, now, that the solenoid 76 is deënergized. The spring 85 will return it to its normal position of equilibrium when the air supply will be cut off from the cylinder 87 and the passage 101 will be put in communication with the exhaust passage 98 and on the escape of air from behind the piston 89 of the cylinder 87 the springs 93 will return the frame 51 to its normal central position, carrying the friction drive wheel 48 out of contact with the flange 47.

When the solenoid 75 is energized the reverse of the operations just described will take place, as will be readily apparent. Now, suppose that the motorman places his controller in the speed-up position, which, it will be assumed, causes the energization of the solenoid 76, and that the controller also closes a clutch circuit, to be presently described, connecting the engine to the transmission disk shown in Fig. 1. Under these conditions it will be assumed that the bridging block 71 is in contact with the segment 63 connected to the solenoids controlling the pins 4 corresponding to the lowest speed, and that these pins are in mesh with the drive gear. Suppose that the particular structure under consideration should for some reason be sluggish in its action and that the arms 68 on the other cars of the train should move faster and so reach the second speed before the first car reached that speed, and that the motorman, considering this speed sufficient, should throw his controller on to the running position, thus cutting out the solenoid 76 and bringing the wheel 48 out of contact with the flange 47. The result of this would be that car number one would still be running on speed number one while the other cars would be running on speed number two, and hence car number one would be moved at a greater rate of speed than the transmission gear provided for, and through this gear would tend to accelerate the engines, thus through the engine governors, forming part of our general system but not herein described, throwing the engine of car number one out of connection with the drive wheels, and car number one would become a trailer. Also, this same trouble might happen to other cars, thus imposing a heavy load on those cars running at speed number two.

It will be noted that the segments 61 overlap the contiguous ends of the segments 63 equally on each side, and it may also be noted that the spaces between the contiguous ends of the segments 61 are purposely made greater than the width of the brush 72 intended to connect the segments 61 to the continuous contact ring 62. Now, all the segments 61 being connected in series are also connected to the solenoid 94 which, by the conductors 105, 106 and 110, is coupled up to one side of the dynamo, the other side of which is coupled up to the continuous contact ring 62. Therefore, when any one of the contact segments 61 is connected to the ring 62 by the brush 72, the solenoid 94 is energized. Now, because of this arrangement, the movement of the arm 68 must be sufficient to traverse the latter half of the segment 63 controlling speed number one, and the first half of the next segment 63, controlling speed number two, before the circuit through the solenoid 94 is broken by the brush 72 reaching the space between two segments 61, which space is greater than the width of the brush. It is not until this point is reached and the solenoid 94 deënergized that the valve 97 will drop away from its seat 100 and thus open the exhaust passage 98 to the exhaust port 99 and thereby permit an equilibrium to be established and the friction wheel 48 to be brought out of operative relation to the respective flange 47. By this time a car upon which the arm 68 has moved sluggishly will have had time for this arm to reach the segment 63 corresponding to speed number two, over which it will continue to move until the brush 72 is brought to the space between two segments 61 and the exhaust passage 98 is permitted to open. In the foregoing it is presumed that after the cars have reached speed number two the motorman has placed his controller on the running position, in which case he has broken the circuit through the solenoids 76 on all the cars and all those cars wherein the arms 68 were prompt in their movement will have established their running rate at the second speed. However, the speed governing device of the sluggish first car will still continue to move even though the engine of this first car has been speeded up by the more rapid bodily movement of the car and the engine has been unclutched from the driving gear. Ultimately, the block 72 will be brought into coincidence with the space between two segments 61 and the solenoid will be deënergized and the cylinder 87 will be exhausted, when the parts will again assume their neutral position with the wheel 48 out of engagement with the respective flange 47.

It may be observed that with proper proportioning of the parts there is little danger of the various cars getting out of step as to the governor for the speed, and that the solenoid 94 is not designed as a regular operating device but simply as a protecting device which is introduced as a precautionary measure for meeting contingencies which might arise even though the design of the structure as a whole is such as to normally avoid such contingencies. Now, it is quite possible that under some circumstances the solenoid 94 might fail to release the valve 97. For such remote contingency the valve may be supplied with a small leak passage 97', so that ultimately the cylinder 87 or 88, whichever may be in service, will exhaust slowly and to a sufficient extent to permit the disengagement of the friction wheel 48 from the flange 47 by the time the second speed has been reached, even though the parts do not at that time come to their full normal position.

It will, of course, be apparent that if on energizing the solenoid 76 there is an acceleration of speed, then on energizing the solenoid 75, which causes a reversal of the operation already described, the speed will be reduced in the same manner but in reverse order to its acceleration.

It will, of course, be apparent that if the controller be placed on the off-position when the car is on—say, the third speed, or any other speed,—that the friction wheel 48 leaving the flange 47 of the sleeve 46 would in such case cause the stoppage of the worm gear 56 and leave the car at that third speed. Now, the clutch circuit, to be hereinafter described, will open and the car will, of course, stop. Now, on starting again under such circumstances, the start will, of course, be made on the third speed, or on whatever speed position the car stopped. Obviously, this would prevent the car or train starting promptly, and under some conditions it might not start at all. Nor can dependence be placed on the motorman setting the controller on the speed-down position previous to a stop, since he may wish to make a very quick stop, or as near an instant stop as possible.

The specific construction of the controller does not enter as a part of this present invention, although forming a component part of our complete system. It is therefore sufficient to state at this time that the controller positions, so far as the present invention is concerned, are as follows and in the order named, that is, off-position, release, speed-down, running, and speed-up. In the release position, the car is released from the drive, since all parts are disengaged except the solenoid 75 or 76, as the case may be. If, for instance, the solenoid 75 be the speed-down solenoid, then this one is maintained energized. All parts are disengaged at the off-position. If the motorman wishes to make a stop, he places the controller on the release position until the car stops, then to the off-position. This gives the structure of Fig. 9 time to place the lowest-speed set of solenoids 26 in circuit ready for the start, the circuit of solenoid 75 being then open. The device is now ready to start, but only on the first or lowest speed.

Suppose the motorman desires to start his train and go on to full speed. He then places his controller on the speed-up position and he may leave it there until the speed has, in his judgment, accelerated to full speed, when the controller should be placed in the running position, causing the deënergization of the solenoid 76 and the return of the various parts to their normal, inactive position with the bridging blocks 71 on the segments 63 connected to the solenoids 26 controlling that series of pins 4 corresponding to the highest speed. But since the motorman cannot know when this speed has been reached except by the exercise of his judgment, and as he may maintain his controller for too long a time on the speed-up position, there is a probability that the arm 68 may carry the block 71 on to the next succeeding segment 63, which would couple up the transmission gear for the lowest speed and cause the probable destruction of the apparatus. Now, we have devised a very simple and efficient means for avoiding this most serious difficulty in the operation of the device, whereby the governor circuit is automatically broken between the points of highest and lowest speed, thus preventing the movement of the controller arm 68 from a position corresponding to the highest to a position corresponding to the lowest speed, and again, in the reverse direction, from the position corresponding to the lowest speed to the position corresponding to the highest speed. This device consists in the switch-arm 108 before referred to. Assume that the arm 68 is moved until it reaches the highest speed, which will correspond to that contact segment 63 upon which the arm is shown as located at the top of the drawing, and assume that the motorman has left the controller upon the speed-up position. The arm 68, of course, continues its movement, which is counter-clockwise under the particular conditions under consideration, but before it can pass from the particular segment 63 on which it is shown to the next one to the left, the extended end 118 of the arm 68 will come in contact with the upturned end 117 of the switch-arm 108 and move the same about its pivot 115 until it is stopped by a suitable pin 120 in its path, and this movement is against the action of the corresponding one of the springs 116. This movement of the switch-arm 108 is sufficient to carry it out of engagement with the contacts 107 and 109, thus breaking the energizing circuit from the dynamo through both solenoids 75 and 76 and the protecting solenoid 94. When this occurs the solenoids 75, 76 and 94 are all deënergized, irrespective of the position of the controller, and the several parts all return to their normal position of rest with the bridging block 71 still upon the highest speed segment 63. On the return of the frame 51 to the middle position of rest the arm 68 is carried with it so that its end 118 moves away from the end 117 of the switch-arm 108, and the latter returns under the action of its springs to a position to bridge the terminals 107 and 109.

When the arm 68 is moved to the position of lowest speed, then on a further movement the switch-arm 108 is forced around its pivot in the opposite direction to that just described and causes the breaking of the main circuit at the contacts 107 and 109, and also produces a momentary closure between the contacts 111 and 112 for a purpose connected with the operation of the engine governor and which need not be further considered herein. Of course, if the motorman should fail to open the controller circuit through the conductors 103 or 104, as the case may be, the return of the arm 108 to the normal position will again energize the solenoids and again start the arm 68 in rotation to again break the circuit between the terminals 107 and 109, and the operation will be repeated until the circuit is broken at the controller.

Should the propelling mechanism for the arm 68 fail to stop quick enough on the deenergization of the solenoids, then, because of the frictional coupling of this arm to the hub of the worm wheel 56, the arm 68 will slip on the worm wheel, since one or the other of the stop pins 120 will hold the switch-arm 108 against any extended movement and the arm 68 will likewise be held against any further movement after the switch-arm 108 comes in contact with one of the pins 120.

Coming, now, to the structure shown in Figs. 11 and 12, it will be observed that the transmission disk is represented as being provided with but three series of pins 4, while the disks 2 and 3 are shown formed integral with a central hub 122 and joined at their outer edges by an integral web 123, and this structure may be taken as indicative of the transmission disk already described with reference to Figs. 1 and 2. Furthermore, the pins 4 are shown as provided with solid heads 124 and surrounded between these heads and the face of the part 3 of the transmission disk by the springs 13, which are so arranged as to tend to maintain the pins with their rounded ends 5 flush with the face of the part 2 of the transmission disk. It will be observed that the arrangement of the pins and the number of series of pins shown in this figure are indicative only, and three series are shown simply for the sake of clearness of the drawing. There may be ten series of pins more or less, as desired, and the manner of mounting the pins so that they are connected in annular series for synchronous movement may be the same as shown in Figs. 2 and 3, or these pins may be otherwise connected, since the invention is not by any means limited to the specific structure shown, either with respect to the particular features just described or to any other of the features which go to make up the present invention, and the various proportions and sizes of the parts and even, to an extent, the arrangement of the parts, may be varied so long as the principles of the invention are adhered to and so long as the objects of the invention are carried out.

Extending diametrically across the face of the transmission disk but suitably spaced therefrom is a shaft 125 which may be considered as the power shaft, although, as will presently appear, this shaft is not the engine shaft but is a continuation thereof through a suitable coupling device which will be described with reference to Figs. 15 and 16.

Keyed upon the shaft 125 for rotation therewith but capable of being moved longitudinally on the shaft for a limited distance, is a clutch member 126 having its opposite faces provided with one-way clutch teeth 127, since the shaft 125 is supposed to rotate in one direction only. Midway of the length of the clutch member 126 there is formed a groove 128 in which engages the forked end 129 of an arm 130, to be hereinafter more particularly referred to with reference to Figs. 13 and 14, it being only necessary to state here that the ends of the arms of the fork 129 are bifurcated, as shown at 131, to receive frusto-conical rollers 132 journaled upon screw pintles or journal bearings 133 which pass through one of the members of the bifurcated ends 131 and are screwed into the other member. These rollers 132 may, if desired, be mounted upon ball-bearings or bearings of other antifriction type. The pitch of the periphery of the rollers 132 and of the corresponding edges of the groove 128, which latter is formed with approaching walls, is so calculated that there will be no slip or difference of peripheral speed between corresponding points on the rollers and groove walls. Each end of the clutch member 126 immediately around the shaft 125 is countersunk, as shown at 134, so as to receive a collar 135 fixed upon the shaft 125 to rotate therewith and also fixed against longitudinal movement on said shaft. The collar 135 will enter the countersunk portion or recess 134 when the clutch member 126 is moved toward the collar, it being understood that there is a collar adjacent to each series of teeth 127 on the two sides of the clutch member 126.

Since the parts on one side of the clutch member 126 are duplicated on the other side thereof, the following description will be limited to the structure shown on one side of said clutch member, with the understanding that it applies equally to the structure on the other side thereof.

Mounted loosely upon the shaft 125 are a number of sleeves 136 having their meeting edges chamfered, as indicated, to receive series of anti-friction balls 137. The sleeve 136 next adjacent to the collar 135 abuts against the latter and may be made much shorter than the other sleeves, and these sleeves may be of such length as to bring the series of balls 137 at equal distances apart and in locations to be hereinafter referred to. The last sleeve 138 of the series may be somewhat longer than the other sleeves and terminate in an exteriorly threaded end 139 and be provided adjacent to the screw threads with an annular flange 140. The threaded end 139 of the sleeve 138 enters a nut formed in a collar 141 mounted upon the shaft 125 and fixed thereon by means of set-screws 142, or otherwise, while a jam nut 143 may be applied to the threaded portion 139 to be screwed tight against the collar 141 when the adjustments hereinafter referred to have been properly made. Mounted upon the balls 137 is another sleeve 144 having one end 145 screw threaded and the other end formed with a radial flange 146 on the outer face of which are formed teeth 147 located in operative relation to the teeth 127 of the clutch member 126, and these teeth 147, with the sleeve 144 and parts carried thereby, constitute the other member of the clutch.

The collar 135 and the contiguous face of the flange 146 are formed with ball-races in which are located anti-friction balls 148, while the end 145 of the sleeve 144 and the corresponding face of the annular flange 140 are also formed with ball-races for the reception of a series of anti-friction balls 149. Now, when the sleeve 144 is in position surrounding the sleeves 136 and the end sleeve 138 is adjusted lengthwise by means of the screw end 139 (which end may be separate from the sleeve 138 and itself constitute an adjusting nut), the several sleeves 136 will be moved toward each other and the several series of balls 137 will be forced outward by the chamfered edges, which constitute ball-races, and the meeting faces of the collar 135 and flange 146 and of the end 145 of the sleeve 144 together with the flange 140, will also be adjusted to bring all the series of balls into proper operative relation to the races, so that the whole structure is freely movable upon ball-bearings.

Mounted upon the sleeve 144 are a number of rings 150, each of which is provided with a key seat 151 by means of which the ring is made fast upon the said sleeve and is rendered immovable with relation thereto in either a circumferential or longitudinal direction. One of the rings 150 abuts against the flange 146 and is located immediately radial to the corresponding series of ball-bearings 137, and the other rings are equidistantly disposed one from the other and are radial to the other series of balls 137, all as indicated in Fig. 11. These rings 150 are provided with an annular series of through perforations 152 having their interior walls suitably hardened, or, as shown in Fig. 12, these perforations may each receive a sleeve 153 of suitably hardened steel.

Extending between the rings 150 are annular series of rollers 154 having their ends 155 frusto-conical, as shown, and between these frusto-conical ends are series of balls 156. Introduced in the perforations 152 of the ring adjacent to the flange 146, or, if need be, secured to or formed on said flange, are short frusto-conical studs 157 of the same diameter as the perforations 152, while the rollers 154 are of somewhat less diameter. Extending into the perforations 152 of the ring 150 most remote from the flange 146 are other studs 158, also of sufficient size to fit snugly into the perforations 152. The studs 158 are either formed upon or secured to or simply engaged by the face of a nut 159 mounted upon the threaded end 145 of the sleeve 144, or, if desired, the engaging face may be made separate from the nut. Now, by screwing up the nut 159 the entire series of rollers are forced together until the series of balls 156 are expanded outward against the inner walls of the perforations 152 or the sleeve 153, as the case may be.

In order to hold the rings 150 in equi-distant relation against longitudinal movement upon the sleeve 144, there may be introduced between them other spacing sleeves 160, each of which at one end terminates short of the corresponding ring 150 and the intervening space is filled with ring laminæ or shims 161, and the space between the last ring 150 and the adjusting nut 159 is also filled in with shims or ring laminæ 161. There is thus provided means whereby when the balls 156 and the corresponding ends of the rollers 154 wear, the parts may be readjusted by removing the thin laminæ or shims 161 so that the wear may be readily taken up.

Now, let it be supposed that there are ten rollers 154 opposite each series of pins 4 on any radial line taken on the transmission disk, and that these rollers and their supports upon the shaft 125 constitute barrel pinions with roller teeth, all properly spaced and adjusted for coaction with the series of pins 4. For the sake of simplicity, let it be supposed that there are but three series of pins 4. When the series of pins 4 nearest to the axis of the transmission disk are projected from the face thereof, they will engage the rollers 154 of each barrel pinion on each side of the axis of said disk. But suppose that the clutch member 126 is at this time occupying a central position with relation to the clutch members on the two barrel pinions. This intermediate clutch member being fast upon the shaft 125 is, of course, rotated with said shaft. The barrel pinions, however, being engaged by the projected pins 4, are held against rotation by the resistance of the driven elements of the mechanism connected with the transmission disk, and because of the anti-friction bearings there is a negligible resistance offered by these barrel pinions to the rotation of the shaft 125. Now, let it be supposed that the clutch member 126 is moved into engagement with the teeth 147 on either barrel pinion, say, the one to the left as viewed in Fig. 11. Assuming that the shaft 125 is rotating in the proper direction, which, in the figure, will be so that the top of the shaft will be moving away from the observer, then the teeth 127 will engage the teeth 147 and impart rotative movement to the left-hand barrel pinion. Immediately rotative motion is imparted to the transmission disk through the projected series of pins 4, while the other barrel pinion, though rotated, is idle upon the shaft 125 because it is not clutched thereto. However, because of the full anti-friction bearings provided, this barrel pinion offers a negligible resistance. The transmission disk is now rotating at the same speed as the shaft 125, assuming that the innermost series of pins 4 correspond in number to the rollers 154 engaging the said series of pins. Now, suppose that the innermost series of pins is withdrawn and the second series of pins is projected in the manner already described. Should the second series of pins not engage the rollers in an exactly intermediate position this is quickly adjusted because of the rolling action of the pins in passing in between the rollers. So the series of pins 4 may be successively retracted and projected to cause a constantly decreasing speed of the transmission disk, supposing the progression to be from the axis of the disk toward the periphery thereof, and any slight lag in the projection of the pins will be quickly taken up by the rolling surfaces that are brought into engagement.

Should it be desired to reverse the direction of rotation of the transmission disk, it is simply necessary to shift the clutch member 126 out of engagement with the pinion first considered and into engagement with the other pinion, when the direction of rotation of the disk will be reversed. This is, however, again referred to later on.

Reverting, now, to the clutch-shifting arm 130 and the means for operating it, reference is had to Figs. 13 and 14. This arm is made fast upon a piston-rod 162 midway of its length, and this rod enters two opposed cylinders 163 arranged in line one with the other, and within the cylinders the piston-rod is surrounded by a spring 164 and carries at each end a piston 165 provided with packing rings 166, while the outer ends of the cylinders are closed by suitable heads 167. Since the detailed construction of the pistons and cylinders may be of any approved type, it is not necessary to describe these parts in detail. Adjacent to the cylinders 163 is a valve chest 168 extended at each end to form a casing 169 for a solenoid 170, and these casings may be closed in with cap plates 171, as indicated. These cap plates are formed with axial bosses 172 constituting the pole pieces of the solenoids, while the movable core or armature 173 of the solenoid passes through the web dividing the valve chest 168 from the solenoid casing. A guide pin 174 may be secured to the end of the solenoid armature and enter a suitable socket formed in the boss 172. It will be understood that there are two solenoids 170, one at each end of the valve chest, but in the drawing only one of these solenoids is visible, while the solenoid armatures are, in fact, the two ends of a valve rod 175 carrying a slide-valve 176 of ordinary structure. Between each end of the slide-valve and the corresponding end of the valve chest there is a spring 177 surrounding said valve rod, or, more properly, the armature extension thereof. Leading from the valve chest 168 to the further end of each cylinder 163 is a conduit 178, while another centrally disposed passage 179 leads from the interior of the valve chest to the external air. The valve chest is provided with an inlet opening 180 which is to be considered as being connected with a source of air supply under pressure, which in our complete system is the air-brake supply reservoir of the car, whence air is delivered to the valve chest 168 under a pressure of, say, seventy pounds to the square inch.

The clutch-operating arm 130 is continued beyond the piston-rod 162, as shown at 181, and finally embraces a rod 182 mounted in the main frame or connecting structure of the cylinders and valve chest, parallel with the piston-rod, so that the said piston-rod is relieved from torsional strain and the clutch-operating arm is made to reciprocate in a true plane.

At 183 is shown a conventional representation of a manually operated controller which is presumed to be under the manipulation of the motorman, but no attempt is made to show the construction of this controller since such construction in itself forms no part of the present invention, although it does form an integral part of our complete system. This controller is introduced in the drawing for the purpose of diagrammatically representing the electrical connections therefrom to the solenoids 170.

Our complete system contemplates a dynamo as the source of electric energy and the leads from the dynamo are represented at 184 and 185. The lead 185 is connected by a branch conductor 186 to the controller, and from the controller leads a conductor 187 connecting to one side of one of the solenoids, the other side of which connects by a conductor 188 to the dynamo lead 184. Another conductor 189 coming from the controller leads to one side of the other solenoid 170, while the return from this solenoid is by a conductor 190 to the dynamo lead 184. Now, when the controller is in the "off" position no current flows to either solenoid 170 and the springs 177 therefore centralize the slide-valve 176, so that both cylinders 163 are connected to the conduit 178, and by the slide-valve to the exhaust opening 179. Suppose, now, that one of the solenoids 170 is energized by the proper manipulation of the controller. The slide-valve 176 will be drawn in the appropriate direction, opening up one of the conduits 178 to the corresponding cylinder 163. Let it be supposed that the other cylinder 163 receives air from the valve chest 168; then the clutch-operating arm 130 will be moved toward the left, as viewed in Fig. 13, and, considering the positions to be the same in Fig. 11, then the pinion toward the left of Fig. 11 is clutched to the drive shaft 125 and motion is imparted to the transmission disk by said pinion, it being understood that in the meantime the appropriate one of the series of pins 4 has been projected by suitable electrical connections established with the structures operating such series of pins. If the car be considered as started, then the series of pins first projected corresponds to the lowest speed, and, as has been before explained, there is a successive acceleration of speed up to the highest, unless the controller has in the meantime been moved to the "running" position, in which case the circuit to the active solenoid 170 is not broken.

Now, let it be assumed that it is desirable to reverse the direction of the transmission disk, then, without tracing out the various steps through which the controller must be moved, it is sufficient to state that the circuit through the active solenoid 170 is ultimately broken, thus allowing the slide-valve 176 to be brought to the neutral position to exhaust the cylinder before charged and then to energize the other solenoid 170 by means of which the other cylinder is brought into communication with the source of compressed air and the arm 130 is moved in the reverse direction, thus coupling up the other pinion to the transmission disk by means of which, both pinions rotating in the same direction but on opposite sides of the axis of the disk, the latter will be impelled in the reverse direction to that in which it was originally rotating.

Fast upon a connecting part 191 between the cylinders 163 is a plate 192 which may be made of insulating material or may be made of metal, and which carries two spaced circuit terminals 193–194 which, if the plate 192 is made of metal, are suitably insulated therefrom. The terminal 194 is connected by a conductor 195 to the dynamo lead 184, while the terminal 193 is connected by a conductor 196 to a structure to be hereinafter described. The arm 130 carries a bracket 197 insulated therefrom upon which are two contacts 198 arranged to bridge the terminals 193 and 194, so that as the arm 130 is brought to the central position with relation to the cylinders 163 the bridging contracts 198 will engage the terminals 193 and 194 and complete the circuit through them, but this circuit is broken before the movement of the arm 130 in either direction is sufficient to bring the clutch member 126 into engagement with one or the other of the barrel pinions on the shaft 125. The purpose of these electrical connections under the control of the arm 130 will be apparent from a consideration of the structures shown in Figs. 15 and 16, to which reference is now made.

In Fig. 15 there is shown one end of the shaft 199 which is a portion of the shaft of the engine constituting the prime mover of the car upon which the structure is mounted. This engine shaft 199 and the power shaft 125 are in alinement. Mounted upon the shaft 199 for rotation therewith but at the same time capable of longitudinal movement on said shaft, is a friction disk 200, and mounted upon the shaft 125 so as to rotate therewith but fixed against longitudinal movement thereon is another friction disk 201, the two friction disks being located at the meeting ends of the two shafts and so related as to be brought into frictional engagement one with the other. The engaging faces of the two disks are provided with annular teeth 202 so arranged as to intermesh. These teeth may in cross section be shaped like standard screw threads, and are arranged so that when their side walls are in frictional engagement their outer edges are not quite seated in the meeting edges of the bases of the teeth on the opposing disk, so that there is a certain amount of latitude of movement of the disks toward each other to take up wear before the outer edges of the teeth will reach the inner meeting edges of the bases of the teeth of the opposing disk. The periphery of the disk 201 is frusto-conical, and when the disks are brought into frictional contact this edge engages frictionally with an annular flange 203 formed on the disk 200 and overhanging the periphery of the disk 201. The inner face of the flange 203 is made conical to receive the conical periphery of the disk 201. The disk 200 is provided with a hub 204 projecting from the face opposed to the clutch face, and this hub has formed on its outer end an annular flange 205, one face 206 of which is beveled at a suitable angle to receive frusto-conical rollers 207 mounted in the forked ends 208 of a yoke 209 formed on the end of a lever 210, shown in Fig. 16 and to be presently described. The journal supports for the rollers 208 are in the form of shouldered screws 211, the heads of which are cylindrical and support the rollers, and each head terminates in a shoulder from which projects a threaded stem 212 entering a nut formed in the corresponding forked member 208. It will be understood that the screw journal bearings 233 and others, though not so shown, are similarly formed. Also ball bearings may be used.

The outer face of the hub 204 is recessed, as shown at 213, to receive one end of a large helical spring 214 surrounding the engine shaft 199 and having its other end seated in the face of a collar 215 fixed upon the shaft 199 against rotation by a spline 216 and against longitudinal movement by set-screws 217.

The tendency of the spring 214 is to force the disk 200 into such frictional engagement with the disk 201 as to cause the latter to turn with the disk 200 and thus impart rotary motion to the shaft 125. By means of the collar 215, the tension of the spring 214, and consequently the clutching action between the disks 200—201, may be regulated.

The friction disk 201 is provided with a hub 218 projecting from the side remote from the friction face thereof, and this hub is provided with an annular recess 219 receiving one end of a helical spring 220 encircling the shaft 125 and having its other end seated in a suitable annular recess 221 formed in a dished follower 222, the diameter of which is a little less than that of the clutch member 201. This dished follower 222 carries about its periphery a number of pins 223 parallel with the shaft 125 and equally spaced about said follower. For the sake of clearness, only a few of these pins are shown but it will be understood that a sufficient number for the purpose are provided. Each pin has formed on it a shoulder 224 abutting against the face of the follower 222 toward the clutch disk 201, and from this shoulder there projects a threaded stem 225 passing through a suitable perforation in the follower 222 and receiving a nut 226 by means of which the pin is securely fastened in place. Each of these pins has its free end formed semi-spherical, as indicated at 227, and normally rests within perforations 228 formed in the clutch disk 201 near its periphery, while similarly located in the clutch member 200 are an equal number of sockets 229.

The follower 222 when under the action of the spring 220 abuts against a fixed collar 230 upon the shaft 125, and when in this position the ends 227 of the pins 223 are about flush with the engaging face of the clutch disk 201. When, however, the follower is moved against the action of the spring 220 toward the clutch member 201, as will presently appear, the pins 223 are projected beyond the engaging face of the clutch member 201 and ultimately enter the recesses in the clutch member 200, thus securely locking the two clutch members together irrespective of their frictional engagement.

Formed upon the collar 230 are matched ears 231, there being one pair of ears on one side and another pair of ears diametrically opposite and projecting radially from the collar 230. Extending through these ears are screw journal pins 232, similar to the pins 211 before referred to, and mounted upon these pins are two bell-crank levers 233, each having its shorter arm 234 connected by a link 235 to ears 236 formed at diametrically opposite points on the follower 222, being connected thereto by a suitable pin 237, while the other arm 238 of each bell-crank lever is made considerably longer than the arm 234 and carries a weight 239 adjustably secured to the arm 238 by means of set-screws 240. The outer end of each arm 238 is bifurcated to receive a bell-crank lever 241 held thereto by a suitable pin 242, and which lever 241 has one arm 243 terminating in a ball or weight 244, while the other arm 245 terminates in a hook 246. The lever is under the normal control of a spring 247 secured at one end to the arm 245 and at the other end by a screw 248 or otherwise to the arm 238 of the bell-crank lever 233. In the path of the hooks 246 of the arms 245 of the two bell-crank levers 241 is a collar 249 having one face recessed to form an annular shoulder 250 behind which the hooks 246 engage.

Reverting, now, to the lever 210, it will be observed, as shown in Fig. 16, that this lever is pivoted upon a bracket 251 projecting from a cylinder 252 suitably supported upon a fixed portion (not shown) of the structure. Within this cylinder there is a piston 253 provided with a suitable packing ring 254 and having a central stud 255 connected by a link 256 to the shorter arm 257 of the lever 210. The corresponding end of the cylinder 252 is provided with an opening 258 for the passage of the stud and link. The head 259 of the cylinder is provided with an axial extension 260 through which extends a piston-rod 261 having its free end seated in a socket 262. The function of this rod 261 and its seat 262 is to guide the piston and hold it in its movement in proper relation to the walls of the cylinder 252. Formed as an offset to, or separately formed and attached to the extension 260, is a casing 263 containing a chamber 264 in which is located a slide-valve 265 formed at one end with a guiding head 266 fitting the interior of the chamber 264 and having a number of perforations 267 to prevent dash-pot action. The chamber 264 is provided with an inlet opening 268 which, while not so shown, is to be understood as being in communication with the air reservoir of the air-brake system, so that air under a pressure of, say, seventy pounds to the square inch, may always prevail in the chamber 264.

Leading from the cylinder 252 on the working side of the piston 253 is a conduit 269, and leading from the chamber 264 to the external air is an exhaust passage 270. The slide-valve is movable to a sufficient extent to uncover the conduit 269 to the interior of the chamber 264 and to put the conduit 269 into communication with the exhaust port or passage 270. The slide-valve 265 is provided with a valve stem 271, one end 272 of which enters and constitutes the armature of a solenoid 273 housed in the casing 263 and confined between a head 274, constituting one wall of the chamber 264, and a screw-plug 275 at the end of the casing 263. The plug 275 is protected by a cap nut 276. Surrounding the valve stem between the valve and the head 274 is a helical spring 277 tending to force the valve toward the other end of the chamber 264, in which position it opens the cylinder 252 to the external air. The conductor 196 coming from the terminal 193 before referred to is connected to one terminal of the solenoid 273, while the other terminal of this solenoid is connected by a conductor 278 to the conductor 185.

When the clutch-operating arm 130 is in the central or neutral position, thus causing the terminals 193 and 194 to be bridged, it will be observed that there is a circuit established between the line conductor 184 through the terminals 193 and 194, thence by the conductor 196 to the solenoid 273, and out by the conductor 278 to the conductor 185. Thus when the arm 130 is in the central position, in which case the clutch member 126 is inactive, the solenoid 273 is energized and the slide-valve 265 is drawn toward the solenoid so as to open the passage 269 to the chamber 264, thus allowing the compressed air in the chamber 264 to flow to the working side of the piston 253 and force the same outward toward the other end of the cylinder 252. This will cause the lever 210 to be rocked on its pivots and bring the rollers 207 into engagement with the face 206 of the flange 205, thereby moving the friction clutch disk 200 away from the other clutch disk 201 and against the action of the spring 214. Let it now be assumed that the parts are in the position just described, with the clutch disks 200 and 201 separated. Also, that the bell-crank levers 233 are in the position where the hooks 246 are in engagement with the shoulders 250. Also, that the engine shaft 199 is rotating at normal speed, for example, one thousand revolutions per minute. Now, let it be further assumed that the controller is moved to the speed-up position, thus energizing the solenoid 75 or 76, as the case may be, to bring the series of pins 4 into successive action as has already been described. At the same time the proper one of the solenoids 170 is energized, thus causing the slide-valve 176 to be moved in the direction to admit air behind the proper piston 165 to cause the arm 130 to be moved in a direction to impel the clutch member 126 into engagement with the proper one of the barrel pinions to impart movement from the shaft 125 to the transmission disk and through the shaft 1 to the parts to be driven. As soon as the arm 130 is moved away from the central or neutral position the circuit between the contacts 193 and 194 is broken and the solenoid 273 is deënergized. Now, the spring 214 being free to act forces the friction disk 200 into engagement with the friction disk 201 and motion is imparted from the shaft 199 to the shaft 125, which latter rapidly accelerates in speed, but because of the slip between the friction surfaces does not quite reach synchronism. The springs 247 and the governor balls 244 are so adjusted that a speed of, say, nine hundred and sixty revolutions per minute will cause the balls 244 to overcome the resistance of the springs 247 and the hooks 246 will be drawn out of engagement with the shoulder 250. Immediately the heavy weights or governor balls 239 are free to act upon the bell-crank levers 233 and as they fly outward force the follower 222 toward the friction disk 201, thus projecting the pins 223 beyond the working face of the disk 201 and toward and into the recesses 229 in the friction disk 200. Since, however, there is a slight lag in the speed of the disk 201, the pins 223 may not immediately register with the recesses 229, but as the relative speed of the two disks is very slow, in the case under consideration but two-thirds of a revolution per second, the pins will quickly match the recesses 229 and move into them under the impulse of the weights 239. As soon as the pins are seated in the recesses or sockets 229 the two disks 200 and 201 are positively locked together and, of course, the shafts 199 and 125 are likewise locked together positively, so that the shaft 125 will immediately take up the speed of the shaft 199. This would, of course, produce somewhat of a shock on the system, but in our complete system we have provided an elastic connection or shock-absorber which will prevent any harm to the structure because of this sudden, though comparatively slight, acceleration of speed. In addition to this, the speed of the engines may be lowered slightly, this being permitted by an engine governor forming a part of our complete system but not here described, and, also, the shock comes on parts already in motion and in engagement, with the exception of the pins 223, and these may be made to easily stand the relatively slight shearing strain to which they are, under such conditions, subjected. After the shaft 125 has attained the maximum speed the acceleration of speed of the transmission disk continues, as before described, by the progressive projection and retraction of the series of pins 4 until the shaft 1 is moving at a speed to cause the car to run as fast as the motorman wishes.

The various operations so far described are entirely automatic, except the movements of the controller under the hand of the motorman. Now, suppose the motorman moves the controller to the " off " position. The circuit to the solenoid 170 before energized is now broken and under the action of the springs 164 the arm 130 is centralized or moved to the neutral position, thus uncoupling the clutch member 126 from the barrel pinion with which it was in engagement. When the arm 130 is moved to the central or neutral position the solenoid 273 is energized, thus admitting air behind the piston 253 and causing the lever 210 to move the clutch disk 200 against the action of the spring 214 to a sufficient extent to disengage it from the clutch member 201 and to uncouple it from the pins 223. Now, because of the friction of the parts, and other causes, the speed of the shaft 125 rapidly lowers and the governor balls 244 are drawn in by the springs 247. The weights 239 do not so quickly approach the shaft 125 because of their greater weight, but as the speed of the shaft still further diminishes the spring 220 overcomes the centrifugal force acting on the weights 239 and they are ultimately brought close enough to the shaft 125 so that the hooks 246 latch under the shoulder 250 and the structure is therefore locked with the ends 227 of the pins 223 withdrawn into the perforations 228.

It may be observed that we avoid the use of friction clutches for positive drives because of their inevitable slip and because of the rapid wear and heating of the parts. Here, however, the friction clutch acts as such for but a brief period of time and is quickly converted into a positive clutch and so remains except for the brief period of time during which the shaft 125 is speeding up or slowing down. The speeding up or slowing down of the car, however, is entirely independent of the speed of the shaft 125, since this is accomplished, as before described, through the intermediary of the transmission disk and the pins 4, with the electro-mechanical means for driving said pins.

Suppose the motorman should be disposed to play or jockey with his controller, that is, putting it on and off too rapidly for the parts to assume the positions for which they are designed, but so manipulating it that the device shown in Fig. 9 may operate for a sufficient length of time to place the car at the second speed, while the shaft 125 is gaining or losing speed. Now, the friction feature of the clutch shown in Fig. 15 is arranged to transmit only sufficient power for the first or lowest speed of the car. Therefore, the shaft 125 under such conditions cannot come up to a speed where the clutch will become a positive drive. The car begins, therefore, to slow down, thus warning the motorman that the car is losing its speed with his controller at the speed-up position, and that this is due to his jockeying with the controller. He has now only to place his controller on the " off " position, when all parts will disengage, as described, and after waiting a few seconds until the engines, through the switch shown in Fig. 9, have again placed the car on the first speed, he may proceed in the regular order.

In the foregoing description it has been assumed that the slip of the friction clutch may be as high as forty revolutions per minute on an engine speed of one thousand revolutions per minute. This difference of speed is taken merely by way of example and in practice will, in most cases, be materially less.

It will be seen from the foregoing that the structures embodied in the present invention refuse to operate when subjected to abuse, and will not operate under disastrous overloads, as will certain types of electric motors used upon electric traction lines, with resultant heavy repair bills. Again, suppose the motorman should stop his car on a bad grade and then abuse the equipment by overloading the engines in the attempt to start up such grade. Here, again, the friction clutch will refuse to transmit power, and the only recourse the motorman will have is to back to a sufficient distance from the bottom of the grade and make a run for the grade, as is customary in steam locomotive practice.

We wish to call attention to the fact that the solenoids employed in the system under consideration are all of the ironclad type and are therefore most efficient for the purposes for which they are designed.

We wish to further note that the several features of our invention are not necessarily confined to use in the particular relations shown and described, and are not necessarily confined to use in a motorcar traffic system, since these various features of our invention may be used in other connections and wherever their structure and operation admits.

We claim:—

1. In a speed changing mechanism, a progressive series of speed gears, means for moving said speed gears into and out of operation in regular order, the action of said means being in the same sense as the order of movement into and out of operation of the speed gears, and means actuated by the gear operating means when moved to active position for locking the next adjacent gear operating means against movement to the active position.

2. In a speed changing mechanism, a progressive series of speed gears, means for moving said speed gears into and out of operation in regular order, the action of said means being in the same sense as the order of movement into or out of operation of the speed gears, and means actuated by the gear operating means when moved to active position for locking the next adjacent gear operating means on each side against movement to the active position.

3. In a speed changing mechanism, speed changing gears comprising annular series of pins movable into and out of active position, and compressed air controlled means for moving said pin series into active position.

4. In a speed changing mechanism, speed changing gears comprising annular series of pins, springs for holding said series of pins in inactive position, and compressed air controlled means for moving the pins into active position against the stress of the springs.

5. In a speed changing mechanism, a transmission disk comprising spaced parallel parts, pins movable therethrough and connected in annular series, and springs tending to hold each series of pins with their free ends approximately flush with one of said parts.

6. In a speed changing mechanism, a rotatable member, annular series of pins carried thereby and movable into and out of active position, and pneumatically operated pistons in operative relation to each series of pins for moving said pins into active position.

7. In a speed changing mechanism, a rotatable transmission disk, annular series of pins movable through said disk and beyond the face thereof, pneumatically operated pistons for each series of pins, and locking means controlled by the pistons moving a series of pins to lock the next adjacent pistons on each side of the active pistons.

8. In a speed changing mechanism, a series of speed gears, pneumatic means for moving the same into and out of operative position, and electrically controlled valves for the pneumatic actuating means.

9. In a speed changing mechanism, a progressive series of speed gears, and means for automatically and progressively moving said gears into and out of active position.

10. In a speed changing mechanism, a progressive series of speed gears, pneumatic means for moving the same into and out of active position, electrically operated valves controlling the pneumatic means, and other electric means for controlling the electrically operated valves in regular succession.

11. In a speed changing mechanism, a progressive series of speed gears, pneumatic means for moving said gears into active position, electrically controlled valves for the pneumatic means, an electric switch for controlling the electric valve-operating mechanism, a power element, and electrically controlled means for coupling the switch to the power element to cause the switch to progressively and successively energize the electric valve controllers.

12. In a speed changing mechanism, a series of speed gears, pneumatically operated means for moving said gears into active position, electrically operated valves for the pneumatic means, an electric switch for charging the electric valve-operating means in regular order, a power element, and an electro-pneumatic means for coupling said switch to the power element to cause the progressive movement of the gears into active position.

13. In a speed changing mechanism, a progressive series of speed gears, electro-pneumatic means for moving said gears into active position one at a time, means for locking the gears on each side of the active gear in inactive position, an electric switch for controlling the gear setting mechanism in regular order, a power element, and electro-pneumatic means for coupling and uncoupling the switch to and from the power element.

14. In a speed changing mechanism, a progressive series of speed gears, electric means for causing the movement of said gears into active position, an electric switch controlling said electric means for operation in regular order, and means under the control of the switch at both limits of its movement for breaking the electric circuits.

15. In a speed changing mechanism, a series of speed gears, electrically controlled means for moving said gears into and out of active position, an electric switch for controlling the gear shifting devices in regular order, a power element, and electrically controlled means for coupling and uncoupling the switch to and from the power element.

16. In a speed changing mechanism, a number of concentric annular series of connected pins movable into and out of active position, pneumatically operated pistons for projecting said pins into the active position, locking pins between the pistons, and means on each piston coacting with the locking pins for moving the latter into engagement with the piston or pistons next adjacent to the active piston.

17. In a speed changing mechanism, a number of concentric annular series of connected pins movable into and out of active position, pneumatically operated pistons engaging each series at diametrically opposite points, each piston being provided with a circumferential groove, and locking pins interposed between adjacent pistons and movable by the projection of each piston into engagement with the groove of the next adjacent piston.

18. In a speed changing mechanism, annular series of connected pins movable into and out of active position, pneumatically operated pistons in operative relation to the pin series for moving the latter into the active position, a pressure chamber having ports leading to the pressure side of the pistons, and electrically operated valves controlling said ports.

19. In a speed changing mechanism, a series of speed transmitting means, electro-mechanical means for operating the same in predetermined order, and an electric switch for coupling up the electro-mechanical means to a source of electric energy, comprising an unbroken ring conductor, two staggered series of insulated contact plates adjacent to the ring conductor, a switch-arm movable over the conductor and plates, bridge blocks carried by the switch-arm and insulated therefrom, one of said blocks bridging the ring conductor to one series of contact plates and the other block bridging the ring conductor to the other series of contact plates, connections between one series of contact plates and the said electro-mechanical means, common connections between the plates of the other series of contacts, electro-mechanical means for actuating the switch-arm, and other electro-mechanical means controlling the switch-arm-operating means and connected to the last-named series of contact plates.

20. In a speed changing mechanism, a series of progressively active speed gears, electrically controlled means for moving the gears into and out of active position, an electric switch comprising an annular contact and an annular series of contacts connected up to a source of electric power and to the electrically controlled means respectively, a switch-arm, a bridging contact carried by said switch-arm, means for driving said switch-arm comprising a frame mounted on the same axis as the switch-arm and driving gear connected to the switch-arm, a friction element connected to the driving gear, another friction element carried by a power shaft and in the path of the first-named friction element, and electro-mechanical means engaging the frame carrying the switch-arm driving gear for moving the friction elements into and out of engagement.

21. In a device of the character described, a rotary switch-arm, a series of contacts controlled by said switch-arm, another switch-arm in the path of the first-named switch-arm, and electric terminals under the control of the second-named switch-arm arranged to be bridged momentarily by the second-named switch-arm when the first-named switch-arm engages said second switch-arm.

22. In a device of the character described, a rotatable switch-arm, contacts bridged thereby, means for propelling the switch-arm, stops for limiting the extent of travel of the switch-arm in either direction, and a slip connection between the switch-arm and propelling means whereby the switch-arm is held against progressive movement should the propelling means fail to stop when the switch-arm reaches the limit of its travel in either direction.

23. In a device of the character described, a rotatable switch-arm, contacts bridged thereby, means for propelling the switch-arm, stops for limiting the extent of travel of the switch-arm in either direction, a slip support for the switch-arm, and an elastic connection between the switch-arm and its support whereby the switch-arm is constrained to move with the support until it engages one or the other of the stops.

24. In a device of the character described, an electric switch, driving gear for the same, a pivotal support carrying the switch and driving gear, a frictional drive for the gear movable with the switch support into and out of engagement with a power element, electro-pneumatic means for moving the switch support to bring the driving gear into and out of engagement with the power element, and an electrically operated valve controlled by the switch and itself controlling the exhaust port of the electro-pneumatic means.

25. In a device of the character described, an electric switch comprising a rotary switch-arm, an annular contact, a series of individual contacts, a bridging contact carried by the switch-arm and bridging the annular contact and series of contacts, another series of contacts adjacent to the annular contact, said second-named contacts being coupled together but having their ends spaced and opposite intermediate points of the first-named series of contacts, a bridging contact carried by the switch-arm and engaging the annular contact and the second-named series of contacts but too narrow to bridge the space between the ends of the second-named series of contacts, driving means for the switch-arm movable into and out of engagement with a power element, electro-pneumatic means for moving the switch-arm-driving mechanism into and out of engagement with the power element, said electro-pneumatic means having an exhaust passage, a solenoid connected with the second-named series of contacts, and a valve controlled by the solenoid and located in the exhaust passage of the electro-pneumatic mechanism.

26. In a device of the character described, an electric switch comprising a rotary switch-arm, an annular contact, a series of individual contacts, a bridging contact carried by the switch-arm and bridging the annular contact and series of contacts, another series of contacts adjacent to the annular contact, said second-named contacts being coupled together but having their ends spaced and opposite intermediate points of the first-named series of contacts, a bridging contact carried by the switch-arm and engaging the annular contact and the second-named series of contacts but too narrow to bridge the space between the ends of the second-named series of contacts, driving means for the switch-arm movable into and out of engagement with a power element, electro-pneumatic means for moving the switch-arm-driving mechanism into and out of engagement with the power element, said electro-pneumatic means having an exhaust passage, a solenoid connected with the second-named series of contacts, and a valve provided with a leak passage and located in the exhaust passage of the electro-pneumatic mechanism.

27. A speed changing mechanism comprising a transmission disk, annular series of pins carried by said disk and arranged concentrically thereon, barrel pinions, each comprising as many annular series of rollers as there are series of pins on the transmission disk, a shaft carrying said barrel pinions diametrically with relation to said disk with the pinions on opposite sides of the axis of the disk, and a clutch for coupling either of said pinions to the shaft.

28. In a speed changing mechanism, a rotatable transmission disk, concentric annular series of pins carried by said disk, each series of pins being movable for projection beyond the face of the disk, a shaft projecting diametrically across the face of the disk, and barrel pinions carried by said shaft, each pinion comprising a number of spaced rings each provided with a circumferential series of perforations, rollers with tapered or conical ends seated in said perforations, and series of anti-friction balls also seated in said perforations and supporting and spacing the rollers one from the other.

29. In a speed changing mechanism, a rotatable transmission disk, concentric annular series of pins carried by said disk, each series of pins being movable for projection beyond the face of the disk, a shaft projecting diametrically across the face of the disk, barrel pinions carried by said shaft and each comprising a series of loose sleeves mounted upon said shaft, the contiguous ends of the sleeves constituting ball-races, anti-friction balls carried by said races, another sleeve exterior to the balls and provided with a clutch-member, spaced rings mounted upon the second-named sleeve and each provided with a circumferential series of perforations, rollers having conical ends mounted in said perforations, anti-friction balls introduced between the ends of the rollers and the walls of the perforations, and a clutch member carried by the shaft and movable into and out of engagement with the clutch member on the sleeve of the pinion.

30. In a speed changing mechanism, a rotatable transmission disk, concentric annular series of pins carried by said disk, each series of pins being movable for projection beyond the face of the disk, a shaft projecting diametrically across the face of the disk, barrel pinions carried by said shaft and each comprising a fixed member upon the shaft, loose sleeves upon the shaft having their contiguous edges formed into ball-races, anti-friction balls in said races, another fixed member upon the shaft, means coacting therewith for adjusting the sleeve lengthwise on the shaft, another sleeve upon the balls carried by the first-named sleeves, rings mounted upon the second-named sleeve for rotation therewith and each provided with a circimferential series of perforations, rollers having tapered or conical ends and mounted in the perforations in the rings, anti-friction balls mounted between the walls of the perforations and the ends of the rollers, spacing means for the rings, adjusting means for the rings and rollers, a clutch member formed on the second-named sleeve, anti-friction bearings between the fixed member on the shaft and the adjusting member of the series of loose sleeves, and a clutch member slidable but mounted for rotation on the shaft.

31. In a speed changing mechanism, a rotatable transmission disk, a power shaft extending diametrically across the face of the disk, pinions, each carrying a clutch member and in operative relation to the transmission disk, a clutch member carried upon the shaft and movable into and out of engagement with the clutch members on the pinions, and means for operating said clutch, comprising a forked arm, pneumatic means for moving said arm to impel the clutch into and out of engagement with either of the pinions, and an electrically operated slide-valve controlling the pneumatic means.

32. In a speed changing mechanism, a rotatable transmission disk, a power shaft extending diametrically across the face of the disk, pinions, each carrying a clutch member and in operative relation to the transmission disk, a clutch member carried upon the shaft and movable into and out of engagement with the clutch members on the pinions, and means for operating said clutch, comprising a forked arm, pneumatic means for moving said arm to impel the clutch into and out of engagement with either of the pinions, a slide-valve for controlling the pneumatic means, solenoids for controlling the slide-valve, and electric circuits from said solenoids to a distant point of control.

33. In a speed changing mechanism, a transmission disk, pinions in operative relation thereto, a shaft carrying said pinions, clutch members on the pinions, another clutch member slidable on the shaft, electro-pneumatic means for operating the clutch, and electric circuit terminals bridged by the clutch-operating means when the latter is in the central or neutral position.

34. In a speed gear, a transmission disk connected to the parts to be driven, a drive shaft therefor, pinions carried by said drive shaft, a clutch between the drive shaft and the pinions, electro-pneumatic means for operating the clutch, circuit terminals bridged by said clutch-operating means when in the central or neutral position, a friction clutch member upon the shaft carrying the pinions, a prime drive shaft, another spring-impelled friction member upon the prime drive shaft and movable by the spring into engagement with the other member of the friction clutch, electro-pneumatic means for impelling the spring-impelled member of the friction clutch against the action of the spring, and connections from the electro-pneumatic means for controlling the friction clutch, said connections including circuit terminals under the control of the switch-arm of the first-named clutch.

35. In a speed changing mechanism, a series of speed gears, pneumatic means for moving the same into and out of operative relation, valves for the pneumatic actuating means, and solenoids connected to and operating said valves.

36. In a speed changing mechanism, a progressive series of speed gears, pneumatic means for moving the same into and out of active position, valves controlling the pneumatic means, solenoids for operating the valves, and other electric means for controlling the solenoids in regular succession.

37. In a speed changing mechanism, a progressive series of speed gears, pneumatic means for moving said gears into active position, electrically controlled valves, each valve being under the control of a solenoid, an electric switch for controlling the solenoids, a power element, and a switch controlling means for coupling the latter to the power element comprising a pneumatically driven element, a valve for the pneumatic drive means, and solenoids controlling the valve.

38. In a speed changing mechanism, a series of progressively active speed gears, pneumatic means for moving the gears into and out of active position, valves and solenoids therefor controlling the pneumatic means, an electric switch comprising an annular contact, and an annular series of contacts, connections between the same and a source of electric power and also to the solenoids, a switch arm, a bridging contact carried by said switch arm, means for driving said switch arm comprising a frame mounted upon a pivotal support, and driving gear connected to the switch arm, a friction element connected to the driving gear, another friction element carried by a power shaft and in the path of the first-named friction element, pneumatic means for actuating said frame carrying the switch arm and driving gear, and solenoids and valves controlled thereby for controlling the pneumatic means.

39. In a device of the character described, an electric switch, driving gear for the same, a pivotal support carrying the switch and driving gear, a frictional drive for the gear, movable with the switch support into and out of engagement with a power element, pneumatic means for moving the switch support to bring the driving gear into and out of engagement with the power element, a valve for controlling the switch support operating means, and solenoids for actuating said valve.

40. In a speed changing mechanism, a rotatable transmission disk, a power shaft extending diametrically across the face of the disk, pinions each carrying a clutch member and in operative relation to the transmission disk, a clutch member carried upon the shaft and movable into and out of engagement with the clutch members on the pinions, and means for operating said clutch comprising a forked arm, pneumatic means for moving said arm to impel the clutch into and out of engagement with either of the pinions, a slide valve controlling the pneumatic means, and solenoids controlling the slide valves.

41. In a power transmission mechanism, a progressive series of speed gears, and means for automatically and progressively moving said gears into and out of active position comprising pneumatically operated pistons, slide valves controlling the said pistons, and solenoids controlling the slide valves.

42. In a power transmission system, a progressive series of speed gears, and means for automatically and progressively moving said gears into and out of active position comprising pneumatically operated pistons, slide valves controlling said pistons, solenoids controlling the slide valves, and an electric switch having a series of contacts connected to the solenoid, said switch being movable over the contacts in regular succession to energize the solenoids in like order.

43. In a power transmission mechanism, a drive element, a driven element, speed changing gears interposed between the drive and driven elements, pneumatically operated pistons controlling said speed changing gears, valves for controlling the admission of compressed air to the pistons, solenoids controlling said valves, an electric switch connected to said solenoids to operate the same in succession, a power element, driving means for the switch movable into and out of operative relation with the power element, pneumatically driven pistons connected to the switch operating means for throwing the same into and out of operative relation with the power element, a slide valve controlling the last-named pistons, solenoids controlling said slide valve, and electric connections from the last-named solenoids to a distant point of control.

44. In a power transmission mechanism, a series of speed gears, electro-magnetic valve operating mechanism, and pneumatically operated means controlled by said valves for moving the speed gears into and out of operative relation, an electric switch controlling the electro-magnetic means in predetermined order, pneumatically operated means for moving the switch into and out of operation, a power means for operating the switch, a slide valve for controlling the admission of air to the pneumatically operated means, solenoids for operating said slide valve, and electric connections from said solenoids to a distance point of control.

45. In a power transmission mechanism, a drive element, a driven element, a clutch for coupling the drive and driven elements, a pneumatically operated means for actuating the clutch, electric means for controlling the pneumatic clutch operating means, a source of prime power, a driven element receiving motion from said source and driving one of the clutch members, another clutch between the source of prime power and the intermediate drive element receiving motion from said source, electrically operated means for moving the last named clutch out of operation, and an electric circuit including the last named electrically operated means and having terminals closed by the first named clutch operating means when in the neutral or inoperative position.

46. In a power transmission mechanism, a drive element, a driven element, a positive clutch for coupling the drive and driven elements, means for moving the clutch into and out of operative relation, pneumatically operated pistons connected to said clutch operating means, a valve for controlling the admission of compressed air to the working sides of the pistons, solenoids controlling said valve, a distant source of control for said solenoids, a prime source of power, an intermediate element driven by the prime source and directly connected to the first named drive element, a friction clutch between the prime source of power and the element driven thereby, a pneumatically operated piston for moving the last-named clutch out of operative position, a valve controlling the admission of air to the last-named piston, a solenoid controlling the last-named valve, and a power circuit including said last-named solenoid and having terminals bridged by the operating means for the positive clutch when the said means are in the neutral or inoperative positions.

47. In a speed changing mechanism, a series of concentric annular gears, means for moving the gears individually into and out of active position, and means actuated by each gear operating means when moved toward the active position to lock the next gear operating means on either side thereof against movement to the active position.

48. In a speed changing mechanism, a series of concentric annular gears, independent means for moving the gears individually into and out of active position, and means actuated by each gear operating means for locking the next adjacent gear operating means on either side against movement to the active position when the said gear operating means is moved toward the active position and for unlocking the gear operating means when the actuated gear operating means is returned to the inactive position.

49. In a speed changing mechanism, a progressive series of speed gears, operating means individual to each gear, means for actuating the gear operating means successively, and means controlled directly by each individual gear operating means when moved to active position for locking the next adjacent gear operating means against movement to active position.

50. In a speed changing mechanism, a progressive series of speed gears, operating means individual to each gear, means for actuating the gear operating means successively, and means controlled directly by each individual gear operating means when moved to active position for locking the next adjacent gear operating means on each side of the active gear operating means against movement to active position.

In testimony that we claim the foregoing as our own, we have hereto affixed our signatures in the presence of two witnesses.

WILLIAM C. MAYO.
JOHN HOULEHAN.

Witnesses:
   Geo. E. Briggs,
   Mabel O. Fahnestock.